(12) United States Patent
Ambrus et al.

(10) Patent No.: US 10,962,780 B2
(45) Date of Patent: Mar. 30, 2021

(54) REMOTE RENDERING FOR VIRTUAL IMAGES

(71) Applicant: Microsoft Technology Licensing, LLC, Redmond, WA (US)

(72) Inventors: Anthony Ambrus, Seattle, WA (US); Dan Kroymann, Kirkland, WA (US); Cameron Quinn Egbert, Sammamish, WA (US); Jeffrey Wallace McGlynn, Seattle, WA (US); Michael Ey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 14/923,082

(22) Filed: Oct. 26, 2015

(65) Prior Publication Data
US 2017/0115488 A1    Apr. 27, 2017

(51) Int. Cl.
*G02B 27/01*    (2006.01)
*G06F 3/01*    (2006.01)
(Continued)

(52) U.S. Cl.
CPC .......... *G02B 27/0172* (2013.01); *G06F 3/011* (2013.01); *G06F 3/012* (2013.01);
(Continued)

(58) Field of Classification Search
CPC . G06F 3/012; G06F 3/01; G06F 3/011; G06F 13/161; G06F 2213/0064; G06T 11/60; G06T 15/005; G06T 19/006; G06T 19/00; G06T 19/20; G06T 7/277; G06T 19/003; G02B 27/0172;
(Continued)

(56) References Cited

U.S. PATENT DOCUMENTS 5,742,264 A * 4/1998 Inagaki ................ G02B 27/017
345/7
5,787,333 A * 7/1998 Rasinski ................ G09B 9/085
434/14

(Continued)

FOREIGN PATENT DOCUMENTS

CN    101080691 A    11/2007
CN    102591449 A    7/2012
(Continued)

OTHER PUBLICATIONS

Welch et al., SCAAT: Incremental Tracking with Incomplete Information, 1997 (Year: 1997).*

(Continued)

*Primary Examiner* — Charles L Beard
(74) *Attorney, Agent, or Firm* — Alleman Hall Creasman & Tuttle LLP

(57) ABSTRACT

One or more sensors of a virtual reality device track a pose of the virtual reality device. The virtual reality device requests a virtual image having a perspective corresponding to a future pose from a remote computer. After receiving the requested virtual image, the virtual reality device adjusts the virtual image to an adjusted virtual image having an updated perspective corresponding to an updated tracked pose of the virtual reality device. Then, a virtual reality display displays the adjusted virtual image.

14 Claims, 8 Drawing Sheets

(51) Int. Cl.
*G06T 11/60* (2006.01)
*G06T 15/00* (2011.01)
*G06T 19/00* (2011.01)

(52) U.S. Cl.
CPC ............ *G06T 11/60* (2013.01); *G06T 15/005* (2013.01); *G06T 19/006* (2013.01); *G02B 2027/014* (2013.01); *G02B 2027/0147* (2013.01); *G02B 2027/0187* (2013.01)

(58) Field of Classification Search
CPC ........ G02B 2027/01873; G02B 27/017; G02B 2027/0187; G02B 2027/014; G02B 2027/0147
See application file for complete search history.

(56) References Cited

U.S. PATENT DOCUMENTS

| | | | | |
|---|---|---|---|---|
| 5,959,597 A * | | 9/1999 | Yamada | G02B 27/017 345/8 |
| 6,092,058 A * | | 7/2000 | Smyth | A61B 5/04842 600/554 |
| 6,133,867 A * | | 10/2000 | Eberwine | G01S 5/0072 342/125 |
| 6,215,780 B1 * | | 4/2001 | Peters | H04B 7/18589 370/320 |
| 6,234,983 B1 * | | 5/2001 | Storey | G06F 3/011 600/595 |
| 6,359,603 B1 * | | 3/2002 | Zwern | G09B 9/00 345/158 |
| 6,415,317 B1 * | | 7/2002 | Yelon | A63F 13/12 709/205 |
| 7,117,157 B1 * | | 10/2006 | Taylor | G06F 3/012 704/246 |
| 7,804,507 B2 | | 9/2010 | Yang et al. | |
| 8,050,881 B1 * | | 11/2011 | Yeung | A61B 5/0024 370/503 |
| 8,098,290 B2 * | | 1/2012 | Mittal | G06K 9/209 348/159 |
| 8,403,757 B2 * | | 3/2013 | Mizrachi | A63F 13/12 463/42 |
| 8,487,838 B2 | | 7/2013 | Lewis et al. | |
| 8,620,069 B1 * | | 12/2013 | Pinkus | G06K 9/468 382/165 |
| 8,633,946 B2 | | 1/2014 | Cohen | |
| 8,813,028 B2 | | 8/2014 | Farooqi | |
| 8,826,344 B1 * | | 9/2014 | Gavade | H04N 21/47217 725/88 |
| 8,886,715 B1 * | | 11/2014 | Zhu | H04L 67/42 709/203 |
| 8,988,509 B1 * | | 3/2015 | Macmillan | H04N 17/002 348/47 |
| 8,990,011 B2 * | | 3/2015 | Zhao | G01C 21/206 701/445 |
| 9,063,330 B2 * | | 6/2015 | LaValle | G02B 27/0093 |
| 9,164,588 B1 * | | 10/2015 | Johnson | G06F 3/017 |
| 9,176,582 B1 * | | 11/2015 | Johnson | G06F 1/163 |
| 9,199,176 B2 * | | 12/2015 | Iwamoto | A63F 13/214 |
| 9,229,540 B2 * | | 1/2016 | Mandella | G06F 3/03545 |
| 9,240,069 B1 * | | 1/2016 | Li | G06T 15/00 |
| 9,269,239 B1 * | | 2/2016 | Jensen | G06K 9/00671 |
| 9,279,983 B1 * | | 3/2016 | Davis | G02B 27/01 |
| 9,329,682 B2 * | | 5/2016 | Keane | G06F 3/013 |
| 9,360,671 B1 * | | 6/2016 | Zhou | G02B 27/017 |
| 9,374,676 B1 * | | 6/2016 | Banin | H04W 64/00 |
| 9,389,088 B2 * | | 7/2016 | Kalai | G01C 21/3415 |
| 9,396,588 B1 * | | 7/2016 | Li | G06F 3/011 |
| 9,451,051 B1 * | | 9/2016 | Ray | H04L 67/38 |
| 9,459,454 B1 * | | 10/2016 | The | G02B 27/017 |
| 9,479,567 B1 * | | 10/2016 | Koorapati | G06F 17/30067 |
| 9,514,551 B2 * | | 12/2016 | Dewan | G06T 11/20 |
| 9,569,812 B1 * | | 2/2017 | Kopf | G06T 1/20 |
| 9,595,083 B1 * | | 3/2017 | Smith | G06T 19/20 |
| 9,652,893 B2 * | | 5/2017 | Michail | G06T 19/006 |
| 9,652,897 B2 * | | 5/2017 | Osborn | G06T 19/20 |
| 9,672,660 B2 * | | 6/2017 | Mullins | H04L 67/38 |
| 9,767,613 B1 * | | 9/2017 | Bedikian | G06T 19/006 |
| 9,779,540 B2 * | | 10/2017 | Katz | G06T 15/205 |
| 9,779,554 B2 * | | 10/2017 | Stafford | A63F 13/26 |
| 9,823,473 B2 * | | 11/2017 | Kobayashi | G06F 3/011 |
| 9,858,637 B1 * | | 1/2018 | Quach | G06T 1/20 |
| 9,897,805 B2 * | | 2/2018 | Stafford | G02B 27/0093 |
| 9,904,969 B1 * | | 2/2018 | Westerhoff | G06T 1/20 |
| 9,927,870 B2 * | | 3/2018 | Li | G06K 9/00382 |
| 9,928,655 B1 * | | 3/2018 | Alston | G06T 7/74 |
| 9,984,441 B2 * | | 5/2018 | Kritt | G06T 3/40 |
| 9,984,499 B1 * | | 5/2018 | Jurgenson | G06T 17/00 |
| 9,992,449 B1 * | | 6/2018 | Ashkenazi | H04N 7/147 |
| 9,992,628 B2 * | | 6/2018 | Lopez-Uricoechea | G01C 21/34 |
| 9,996,149 B1 * | | 6/2018 | Martin | G02B 27/017 |
| 10,026,233 B2 * | | 7/2018 | Li | G06F 3/011 |
| 10,083,538 B2 * | | 9/2018 | Li | G06F 3/015 |
| 10,089,790 B2 * | | 10/2018 | Lawson | G06K 9/00362 |
| 10,127,725 B2 * | | 11/2018 | Kohler | G06T 19/006 |
| 10,194,259 B1 * | | 1/2019 | Martin | G06F 3/011 |
| 10,217,058 B2 * | | 2/2019 | Gamon | G06N 20/00 |
| 10,255,658 B2 * | | 4/2019 | Kono | G06T 15/20 |
| 10,304,199 B2 * | | 5/2019 | Menozzi | G06F 3/04817 |
| 10,313,661 B2 * | | 6/2019 | Kass | G06T 15/205 |
| 10,317,680 B1 * | | 6/2019 | Richards | G02B 27/0093 |
| 10,321,258 B2 * | | 6/2019 | Arteaga | G01S 15/42 |
| 10,338,392 B2 * | | 7/2019 | Kohler | G02B 27/0172 |
| 10,410,349 B2 * | | 9/2019 | Haraden | G06T 7/11 |
| 10,417,739 B2 * | | 9/2019 | Bastani | G06T 3/0093 |
| 10,460,455 B2 * | | 10/2019 | Giurgica-Tiron | G06N 20/00 |
| 10,481,679 B2 * | | 11/2019 | Sevostianov | G06F 1/163 |
| 10,520,739 B1 * | | 12/2019 | Vlachos | G02B 27/18 |
| 10,528,132 B1 * | | 1/2020 | Hassani | G06F 3/013 |
| 10,565,964 B2 * | | 2/2020 | Hicks | G09G 5/377 |
| 10,585,472 B2 * | | 3/2020 | Tokubo | G09G 5/14 |
| 10,599,919 B2 * | | 3/2020 | Freedman | G06F 3/038 |
| 10,629,107 B2 * | | 4/2020 | Yamamoto | G02B 27/017 |
| 10,644,397 B2 * | | 5/2020 | Pallister | H04B 7/0617 |
| 10,698,218 B1 * | | 6/2020 | Geng | G02B 27/0172 |
| 10,699,472 B2 * | | 6/2020 | Yeoh | G06T 15/205 |
| 10,712,817 B1 * | | 7/2020 | Ronngren | G09G 5/37 |
| 10,732,707 B2 * | | 8/2020 | Lavalle | G02B 27/017 |
| 10,802,287 B2 * | | 10/2020 | Selan | G09G 3/22 |
| 2001/0022558 A1 * | | 9/2001 | Karr, Jr. | G01S 1/026 342/450 |
| 2003/0025651 A1 * | | 2/2003 | Susnjara | G06F 3/012 345/8 |
| 2003/0025652 A1 * | | 2/2003 | Susnfara | G06F 3/012 345/8 |
| 2004/0036717 A1 * | | 2/2004 | Kjeldsen | H04N 5/74 715/730 |
| 2004/0039938 A1 * | | 2/2004 | Katz | H04L 63/1458 726/2 |
| 2004/0051680 A1 * | | 3/2004 | Azuma | G03B 13/28 345/8 |
| 2004/0240708 A1 * | | 12/2004 | Hu | G06K 9/00268 382/103 |
| 2005/0165886 A1 * | | 7/2005 | Tuer | B60K 31/0058 709/203 |
| 2005/0196015 A1 * | | 9/2005 | Luo | G06K 9/00234 382/103 |
| 2006/0187850 A1 * | | 8/2006 | Ward | H04J 3/12 370/252 |
| 2006/0188080 A1 * | | 8/2006 | Terpstra | H04M 3/385 379/211.02 |
| 2007/0035562 A1 * | | 2/2007 | Azuma | G03B 13/28 345/633 |
| 2007/0238529 A1 * | | 10/2007 | Iwamoto | H04W 4/60 463/42 |
| 2007/0276590 A1 * | | 11/2007 | Leonard | G01C 21/005 701/468 |
| 2007/0294030 A1 * | | 12/2007 | Jones | G01C 21/26 701/519 |
| 2008/0141127 A1 * | | 6/2008 | Yamamoto | G01C 21/20 715/700 |

(56) References Cited

U.S. PATENT DOCUMENTS

| | | | |
|---|---|---|---|
| 2009/0281718 A1* | 11/2009 | Gibran | G01C 21/32 701/532 |
| 2010/0009747 A1* | 1/2010 | Reville | A63F 13/12 463/31 |
| 2010/0026714 A1* | 2/2010 | Utagawa | G02B 27/017 345/633 |
| 2010/0091096 A1* | 4/2010 | Oikawa | G06F 3/011 348/53 |
| 2010/0195517 A1* | 8/2010 | Kihara | H04L 43/0852 370/252 |
| 2010/0226360 A1* | 9/2010 | Li | H04L 27/2656 370/350 |
| 2011/0050568 A1* | 3/2011 | Hu | G06T 7/73 345/157 |
| 2011/0102469 A1* | 5/2011 | Kami | A63F 13/837 345/682 |
| 2011/0157196 A1* | 6/2011 | Nave | G06F 9/4445 345/522 |
| 2011/0169625 A1* | 7/2011 | James | G06K 9/00597 340/439 |
| 2011/0234584 A1* | 9/2011 | Endo | G02B 27/017 345/419 |
| 2011/0248987 A1* | 10/2011 | Mitchell | G06T 15/20 345/419 |
| 2011/0254860 A1 | 10/2011 | Lontrop et al. | |
| 2012/0056887 A1* | 3/2012 | Kim | G06T 7/0059 345/426 |
| 2012/0105473 A1* | 5/2012 | Bar-Zeev | G02B 27/017 345/633 |
| 2012/0113223 A1* | 5/2012 | Hilliges | G06F 3/00 348/46 |
| 2012/0133748 A1* | 5/2012 | Chung | H04N 13/0022 348/51 |
| 2012/0154390 A1* | 6/2012 | Narita | H04N 13/128 345/419 |
| 2012/0188256 A1 | 7/2012 | Lee et al. | |
| 2012/0281906 A1* | 11/2012 | Appia | H04N 13/026 382/154 |
| 2012/0299911 A1* | 11/2012 | Tytgat | G06K 9/00201 345/419 |
| 2012/0306850 A1 | 12/2012 | Balan et al. | |
| 2012/0308140 A1* | 12/2012 | Ambrus | G06K 9/00362 382/190 |
| 2012/0309532 A1* | 12/2012 | Ambrus | G06F 3/0425 463/36 |
| 2012/0320224 A1* | 12/2012 | Miyoshi | H04N 5/217 348/207.1 |
| 2012/0330659 A1* | 12/2012 | Nakadai | G10L 21/06 704/235 |
| 2013/0003864 A1* | 1/2013 | Sullivan | H04N 19/44 375/240.25 |
| 2013/0041590 A1* | 2/2013 | Burich | G06F 19/3418 702/19 |
| 2013/0079039 A1* | 3/2013 | Heikkilae | H04W 4/025 455/456.6 |
| 2013/0128364 A1* | 5/2013 | Wheeler | A61B 3/113 359/630 |
| 2013/0147838 A1 | 6/2013 | Small et al. | |
| 2013/0151651 A1* | 6/2013 | Chhaochharia | A63F 13/358 709/214 |
| 2013/0169682 A1 | 7/2013 | Novak et al. | |
| 2013/0185022 A1* | 7/2013 | Maehata | G05B 23/0275 702/188 |
| 2013/0307847 A1* | 11/2013 | Dey | G06T 1/00 345/419 |
| 2013/0308016 A1* | 11/2013 | Ishii | H04N 5/232 348/239 |
| 2013/0326364 A1* | 12/2013 | Latta | G06F 3/012 715/751 |
| 2013/0328927 A1* | 12/2013 | Mount | G06T 19/006 345/633 |
| 2013/0335405 A1* | 12/2013 | Scavezze | G06T 19/20 345/419 |
| 2014/0002491 A1 | 1/2014 | Lamb et al. | |
| 2014/0125554 A1* | 5/2014 | Pan | G06T 3/40 345/2.2 |
| 2014/0145079 A1* | 5/2014 | Omino | G01T 1/02 250/336.1 |
| 2014/0146394 A1* | 5/2014 | Tout | G09B 9/307 359/630 |
| 2014/0168261 A1* | 6/2014 | Margolis | G06F 3/011 345/633 |
| 2014/0176591 A1* | 6/2014 | Klein | G09G 3/003 345/589 |
| 2014/0186049 A1* | 7/2014 | Oshima | H04B 10/1143 398/118 |
| 2014/0240313 A1* | 8/2014 | Varga | G06T 19/006 345/419 |
| 2014/0240351 A1* | 8/2014 | Scavezze | G06F 3/011 345/633 |
| 2014/0267420 A1 | 9/2014 | Schowengerdt et al. | |
| 2014/0310595 A1* | 10/2014 | Acharya | G06F 9/453 715/706 |
| 2014/0324249 A1* | 10/2014 | Lacaze | G05D 1/0038 701/2 |
| 2014/0354515 A1* | 12/2014 | LaValle | G06T 5/002 345/8 |
| 2014/0361956 A1* | 12/2014 | Mikhailov | H04N 13/0271 345/8 |
| 2014/0361977 A1* | 12/2014 | Stafford | G02B 27/0093 345/156 |
| 2014/0368534 A1 | 12/2014 | Salter et al. | |
| 2014/0368535 A1* | 12/2014 | Salter | G02B 27/017 345/619 |
| 2014/0372957 A1* | 12/2014 | Keane | G06F 3/013 715/852 |
| 2014/0375634 A1* | 12/2014 | Hillesland | G06T 15/20 345/420 |
| 2015/0002542 A1* | 1/2015 | Chan | G06F 3/048 345/633 |
| 2015/0029218 A1* | 1/2015 | Williams | G06T 19/006 345/633 |
| 2015/0046296 A1* | 2/2015 | Hart | G06T 19/006 705/27.2 |
| 2015/0049004 A1* | 2/2015 | Deering | G02B 27/0172 345/8 |
| 2015/0117757 A1* | 4/2015 | Drazic | H04N 13/0018 382/154 |
| 2015/0123973 A1* | 5/2015 | Larsen | G06T 15/04 345/427 |
| 2015/0134723 A1* | 5/2015 | Kansal | H04L 67/1031 709/203 |
| 2015/0145889 A1* | 5/2015 | Hanai | H04N 5/2621 345/633 |
| 2015/0188984 A1* | 7/2015 | Mullins | H04L 67/04 709/219 |
| 2015/0193949 A1* | 7/2015 | Katz | G02B 27/017 345/8 |
| 2015/0206317 A1* | 7/2015 | Baek | H04N 5/23267 345/625 |
| 2015/0228118 A1* | 8/2015 | Eade | G06T 19/006 345/633 |
| 2015/0234189 A1* | 8/2015 | Lyons | G02B 27/0172 345/174 |
| 2015/0234455 A1* | 8/2015 | LaValle | G06F 3/012 345/8 |
| 2015/0310665 A1* | 10/2015 | Michail | G06T 19/006 345/419 |
| 2015/0317833 A1* | 11/2015 | Ebstyne | G06T 19/006 345/633 |
| 2015/0323988 A1* | 11/2015 | Kuehne | G06F 3/0482 345/8 |
| 2015/0339468 A1* | 11/2015 | Son | G06F 21/31 726/19 |
| 2015/0355332 A1* | 12/2015 | Jeong | G01B 11/24 345/419 |

(56) References Cited

U.S. PATENT DOCUMENTS

| | | | |
|---|---|---|---|
| 2015/0356774 A1* | 12/2015 | Gal | G06F 17/50 345/633 |
| 2015/0373153 A1* | 12/2015 | Jenkins | A63F 13/355 709/203 |
| 2016/0012855 A1* | 1/2016 | Krishnan | G11B 27/105 386/241 |
| 2016/0025971 A1* | 1/2016 | Crow | G02B 27/0093 345/156 |
| 2016/0027141 A1* | 1/2016 | Patel | G06T 1/20 345/522 |
| 2016/0034823 A1* | 2/2016 | Farkas | H04W 16/22 706/12 |
| 2016/0035139 A1* | 2/2016 | Fuchs | G06T 7/60 345/633 |
| 2016/0042566 A1* | 2/2016 | Mao | G06T 19/006 463/32 |
| 2016/0055640 A1* | 2/2016 | Menozzi | G02B 27/0093 345/633 |
| 2016/0070551 A1* | 3/2016 | Miller | G06F 16/958 717/148 |
| 2016/0077166 A1* | 3/2016 | Morozov | G01C 19/00 702/150 |
| 2016/0085310 A1* | 3/2016 | Shotton | G06K 9/6267 382/103 |
| 2016/0087868 A1* | 3/2016 | Polychronis | H04L 43/08 709/224 |
| 2016/0093105 A1* | 3/2016 | Rimon | G06T 19/006 345/633 |
| 2016/0131902 A1* | 5/2016 | Ambrus | G02B 27/0093 345/156 |
| 2016/0155260 A1* | 6/2016 | Jenkins | G06T 15/20 345/419 |
| 2016/0163112 A1* | 6/2016 | Mullins | H04L 67/04 345/633 |
| 2016/0179336 A1* | 6/2016 | Ambrus | G02B 27/017 715/768 |
| 2016/0189429 A1* | 6/2016 | Mallinson | G02B 26/10 345/633 |
| 2016/0205174 A1* | 7/2016 | Pitio | H04L 67/10 709/201 |
| 2016/0209916 A1* | 7/2016 | Sendai | G02B 27/017 |
| 2016/0210780 A1* | 7/2016 | Paulovich | G06T 7/73 |
| 2016/0216760 A1* | 7/2016 | Trutna | G06F 3/012 |
| 2016/0217760 A1* | 7/2016 | Chu | G06T 1/20 |
| 2016/0219267 A1* | 7/2016 | Chu | H04L 65/605 |
| 2016/0219272 A1* | 7/2016 | Fujimaki | H04N 13/044 |
| 2016/0219325 A1* | 7/2016 | Chu | H04N 21/42653 |
| 2016/0227098 A1* | 8/2016 | Yasuhara | B60R 1/00 |
| 2016/0238852 A1* | 8/2016 | Ellsworth | G02B 27/0179 |
| 2016/0252955 A1* | 9/2016 | Yamamoto | H04N 5/74 345/441 |
| 2016/0253842 A1* | 9/2016 | Shapira | G02B 27/017 345/633 |
| 2016/0259403 A1* | 9/2016 | Wang | G06F 3/1415 |
| 2016/0260251 A1* | 9/2016 | Stafford | G06T 19/006 |
| 2016/0260261 A1* | 9/2016 | Hsu | B23K 9/173 |
| 2016/0261300 A1* | 9/2016 | Fei | G06T 7/593 |
| 2016/0262608 A1* | 9/2016 | Krueger | G06T 19/006 |
| 2016/0267720 A1* | 9/2016 | Mandella | G06T 19/006 |
| 2016/0282619 A1* | 9/2016 | Oto | G06F 3/012 |
| 2016/0284126 A1* | 9/2016 | Leppanen | G06T 7/20 |
| 2016/0321548 A1* | 11/2016 | Ziskind | G06N 7/005 |
| 2016/0350973 A1* | 12/2016 | Shapira | G06T 19/006 |
| 2016/0358299 A1* | 12/2016 | Toth | G06F 3/147 |
| 2016/0360466 A1* | 12/2016 | Barak | H04W 8/26 |
| 2017/0003750 A1* | 1/2017 | Li | G06T 17/00 |
| 2017/0003764 A1* | 1/2017 | Li | G06T 19/006 |
| 2017/0004648 A1* | 1/2017 | Li | G02B 27/017 |
| 2017/0010692 A1* | 1/2017 | Getz | G06F 3/0346 |
| 2017/0017831 A1* | 1/2017 | Rollend | G06K 9/00228 |
| 2017/0018086 A1* | 1/2017 | Zhang | H04N 5/232 |
| 2017/0018121 A1* | 1/2017 | Lawson | G06T 17/00 |
| 2017/0024624 A1* | 1/2017 | Bieg | G06F 3/013 |
| 2017/0034037 A1* | 2/2017 | Gilad | H04L 43/50 |
| 2017/0038837 A1* | 2/2017 | Faaborg | G06F 3/0482 |
| 2017/0053450 A1* | 2/2017 | Rodriguez | G06T 7/579 |
| 2017/0060264 A1* | 3/2017 | Gasselin de Richebourg | G06F 3/038 |
| 2017/0060286 A1* | 3/2017 | Gasselin de Richebourg | G06F 3/044 |
| 2017/0060645 A1* | 3/2017 | Gasselin de Richebourg | G06F 9/54 |
| 2017/0103457 A1* | 4/2017 | Acuna-Rohter | G06Q 40/04 |
| 2017/0115488 A1* | 4/2017 | Ambrus | G02B 27/0172 |
| 2017/0124170 A1* | 5/2017 | Koorapati | G06F 17/30575 |
| 2017/0124713 A1* | 5/2017 | Jurgenson | G06T 19/006 |
| 2017/0148206 A1* | 5/2017 | Donner | G06T 15/04 |
| 2017/0154464 A1* | 6/2017 | Lanier | G02B 27/0172 |
| 2017/0155885 A1* | 6/2017 | Selstad | H04N 13/344 |
| 2017/0160518 A1* | 6/2017 | Lanman | G06T 19/006 |
| 2017/0160795 A1* | 6/2017 | Hu | G06F 3/017 |
| 2017/0160798 A1* | 6/2017 | Lanman | G02B 27/0172 |
| 2017/0161951 A1* | 6/2017 | Fix | G06T 5/00 |
| 2017/0177082 A1* | 6/2017 | Michail | G06F 3/013 |
| 2017/0180721 A1* | 6/2017 | Parker | H04N 13/341 |
| 2017/0185144 A1* | 6/2017 | Li | G06F 3/012 |
| 2017/0186231 A1* | 6/2017 | Petrov | G06T 19/006 |
| 2017/0200304 A1* | 7/2017 | Li | G06T 15/10 |
| 2017/0208416 A1* | 7/2017 | Petrov | H04S 7/304 |
| 2017/0213388 A1* | 7/2017 | Margolis | G06T 19/006 |
| 2017/0249745 A1* | 8/2017 | Fiala | G06K 9/00671 |
| 2017/0254664 A1* | 9/2017 | Parekh | G08G 5/0021 |
| 2017/0262054 A1* | 9/2017 | Lanman | G06F 3/013 |
| 2017/0287409 A1* | 10/2017 | Richards | G09G 3/3406 |
| 2017/0289219 A1* | 10/2017 | Khalid | G06F 3/00 |
| 2017/0289530 A1* | 10/2017 | Smithwick | H04N 13/0404 |
| 2017/0291704 A1* | 10/2017 | Alegria | B64C 39/022 |
| 2017/0294989 A1* | 10/2017 | Chen | H04L 1/18 |
| 2017/0295446 A1* | 10/2017 | Thagadur Shivappa | G06F 3/011 |
| 2017/0302918 A1* | 10/2017 | Mammou | H04N 19/162 |
| 2017/0316607 A1* | 11/2017 | Khalid | G06F 3/147 |
| 2017/0347084 A1* | 11/2017 | Boyce | G06F 3/013 |
| 2017/0347236 A1* | 11/2017 | Frusina | H04M 1/72572 |
| 2017/0353812 A1* | 12/2017 | Schaefer | H04R 3/04 |
| 2017/0358136 A1* | 12/2017 | Gollier | G06F 1/163 |
| 2017/0372494 A1* | 12/2017 | Zhu | G06T 9/00 |
| 2017/0373890 A1* | 12/2017 | Fertonani | H04L 25/02 |
| 2017/0374343 A1* | 12/2017 | Boulton | G06F 3/012 |
| 2017/0374344 A1* | 12/2017 | Boulton | G06T 7/70 |
| 2018/0008141 A1* | 1/2018 | Krueger | A61B 5/11 |
| 2018/0017659 A1* | 1/2018 | Irie | H04N 5/23296 |
| 2018/0018783 A1* | 1/2018 | Menozzi | G06F 1/163 |
| 2018/0025478 A1* | 1/2018 | Lee | H04N 5/23238 382/284 |
| 2018/0039083 A1* | 2/2018 | Miller | G06F 3/012 |
| 2018/0040162 A1* | 2/2018 | Donnelly | G06T 19/006 |
| 2018/0041849 A1* | 2/2018 | Farmani | H04R 25/554 |
| 2018/0049023 A1* | 2/2018 | Stuber | H04M 1/72522 |
| 2018/0059779 A1* | 3/2018 | Sisbot | G06K 9/00805 |
| 2018/0075653 A1* | 3/2018 | Schillings | A63H 5/00 |
| 2018/0078034 A1* | 3/2018 | Savall | A61B 34/74 |
| 2018/0081171 A1* | 3/2018 | Park | G06F 3/013 |
| 2018/0081178 A1* | 3/2018 | Shpunt | H04N 13/398 |
| 2018/0091791 A1* | 3/2018 | Jiang | B24B 23/026 |
| 2018/0091924 A1* | 3/2018 | Hammerschmidt | H04S 7/304 |
| 2018/0108170 A1* | 4/2018 | Tomlin | G06F 3/0346 |
| 2018/0161682 A1* | 6/2018 | Myhill | A63F 13/213 |
| 2018/0167132 A1* | 6/2018 | Balk | F41A 17/08 |
| 2018/0175926 A1* | 6/2018 | Rudrapatna | H04B 7/0632 |
| 2018/0188384 A1* | 7/2018 | Ramanandan | G01S 19/45 |
| 2018/0189661 A1* | 7/2018 | Tatourian | H04L 63/108 |
| 2018/0190037 A1* | 7/2018 | Sou | G02B 27/0172 |
| 2018/0190091 A1* | 7/2018 | Yuan | H04N 21/42222 |
| 2018/0192058 A1* | 7/2018 | Chen | H04N 11/60 |
| 2018/0196509 A1* | 7/2018 | Trail | G02B 27/0172 |
| 2018/0203505 A1* | 7/2018 | Trail | G02B 27/0093 |
| 2018/0204078 A1* | 7/2018 | Seng | B60W 50/16 |
| 2018/0205943 A1* | 7/2018 | Trail | H04N 13/254 |
| 2018/0206134 A1* | 7/2018 | Kudo | H04W 24/00 |
| 2018/0220119 A1* | 8/2018 | Horvitz | H04N 21/23436 |
| 2018/0232928 A1* | 8/2018 | Grant | G06T 13/40 |

(56) References Cited

U.S. PATENT DOCUMENTS

| | | | |
|---|---|---|---|
| 2018/0239145 A1* | 8/2018 | Lanman | G02B 27/0172 |
| 2018/0261012 A1* | 9/2018 | Mullins | G06T 19/006 |
| 2018/0262847 A1* | 9/2018 | Pedersen | H04R 25/405 |
| 2018/0262849 A1* | 9/2018 | Farmani | H04R 25/552 |
| 2018/0268589 A1* | 9/2018 | Grant | G06F 3/017 |
| 2018/0275748 A1* | 9/2018 | Haraden | G06T 15/503 |
| 2018/0276824 A1* | 9/2018 | Haraden | G09G 3/003 |
| 2018/0277164 A1* | 9/2018 | Wang | H04N 21/2353 |
| 2018/0284872 A1* | 10/2018 | Schluessler | G06F 9/5083 |
| 2018/0284876 A1* | 10/2018 | Ray | G06F 1/3231 |
| 2018/0286105 A1* | 10/2018 | Surti | H04N 13/344 |
| 2018/0288423 A1* | 10/2018 | Vembar | H04N 19/167 |
| 2018/0292895 A1* | 10/2018 | Schluessler | G06F 3/011 |
| 2018/0300098 A1* | 10/2018 | Vembar | G09G 5/363 |
| 2018/0300897 A1* | 10/2018 | Woods | G06F 3/011 |
| 2018/0301110 A1* | 10/2018 | Feng | G09G 5/38 |
| 2018/0302590 A1* | 10/2018 | Kuzyakov | G06K 9/3233 |
| 2018/0307306 A1* | 10/2018 | Johnston | G06F 3/012 |
| 2018/0308451 A1* | 10/2018 | Saur | G09G 3/002 |
| 2018/0308455 A1* | 10/2018 | Hicks | G06F 3/013 |
| 2018/0309927 A1* | 10/2018 | Tanner | G06F 3/011 |
| 2018/0341323 A1* | 11/2018 | Mate | G06F 3/011 |
| 2018/0356882 A1* | 12/2018 | Kaneko | G02B 27/017 |
| 2018/0374192 A1* | 12/2018 | Kunkel | G06T 15/205 |
| 2019/0006754 A1* | 1/2019 | Pallister | H01Q 3/28 |
| 2019/0026864 A1* | 1/2019 | Chen | G06T 3/4046 |
| 2019/0026904 A1* | 1/2019 | Chen | G06T 7/74 |
| 2019/0035363 A1* | 1/2019 | Schluessler | G06T 15/405 |
| 2019/0037203 A1* | 1/2019 | Ishiguchi | H04N 13/225 |
| 2019/0037462 A1* | 1/2019 | Chowdhury | H04L 65/604 |
| 2019/0041976 A1* | 2/2019 | Veeramani | G06F 3/011 |
| 2019/0057542 A1* | 2/2019 | Bronder | G06T 3/0006 |
| 2019/0058853 A1* | 2/2019 | Brudnak | H04N 7/185 |
| 2019/0058863 A1* | 2/2019 | Sameer | H04N 5/23238 |
| 2019/0072367 A1* | 3/2019 | Balk | |
| 2019/0147221 A1* | 5/2019 | Grabner | G06T 19/006 382/103 |
| 2019/0155372 A1* | 5/2019 | Cuervo | G06T 1/60 |
| 2019/0158731 A1* | 5/2019 | Demarty | G06F 3/0346 |
| 2019/0200902 A1* | 7/2019 | El Kouby-Benichou | A46B 15/0002 |
| 2019/0206115 A1* | 7/2019 | Tytgat | G06T 15/20 |
| 2019/0209005 A1* | 7/2019 | Barraza-Bernal | A61B 3/0025 |
| 2019/0212158 A1* | 7/2019 | Gordon | G01C 21/3415 |
| 2019/0228215 A1* | 7/2019 | Najafirad | G06K 9/00302 |
| 2019/0235624 A1* | 8/2019 | Goldberg | G06F 1/163 |
| 2019/0236344 A1* | 8/2019 | Chen | G06K 9/00355 |
| 2019/0243472 A1* | 8/2019 | Stafford | A63F 13/26 |
| 2019/0244436 A1* | 8/2019 | Stansell | G06F 3/0482 |
| 2019/0250702 A1* | 8/2019 | Cristani | G06F 3/011 |
| 2019/0251892 A1* | 8/2019 | Stoll | A63F 13/213 |
| 2019/0279603 A1* | 9/2019 | Hada | G08G 1/16 |
| 2019/0286231 A1* | 9/2019 | Burns | G02B 27/0172 |
| 2019/0320142 A1* | 10/2019 | Cutler | H04N 7/147 |
| 2019/0354174 A1* | 11/2019 | Young | G09G 5/393 |
| 2019/0356894 A1* | 11/2019 | Oh | H04N 21/23434 |
| 2019/0373391 A1* | 12/2019 | Han et al. | G06F 3/011 |
| 2019/0379893 A1* | 12/2019 | Krishnan | H04N 19/132 |
| 2019/0384378 A1* | 12/2019 | Ebert | G02B 27/0176 |
| 2019/0392212 A1* | 12/2019 | Sawhney | G06K 9/00201 |
| 2020/0005486 A1* | 1/2020 | Sinha | G06T 7/337 |
| 2020/0035203 A1* | 1/2020 | Kosik | G06F 3/015 |
| 2020/0043223 A1* | 2/2020 | Leiby | G06T 19/006 |
| 2020/0045285 A1* | 2/2020 | Varerkar | H04N 19/29 |
| 2020/0051320 A1* | 2/2020 | Laffont | G06F 3/011 |
| 2020/0090403 A1* | 3/2020 | Ishida | G06F 3/01 |
| 2020/0092488 A1* | 3/2020 | Bhuruth | H04N 13/117 |
| 2020/0094141 A1* | 3/2020 | Fersch | H04S 3/008 |
| 2020/0111195 A1* | 4/2020 | Vlachos | G06F 3/012 |
| 2020/0124940 A1* | 4/2020 | Shimada | G06T 7/20 |
| 2020/0125066 A1* | 4/2020 | Abe | G06T 19/00 |
| 2020/0132996 A1* | 4/2020 | Yokota | G02B 27/0101 |
| 2020/0133000 A1* | 4/2020 | Amati | G06T 15/10 |
| 2020/0135150 A1* | 4/2020 | Sugihara | G09G 5/10 |
| 2020/0167712 A1* | 5/2020 | Stracquatanio | G06K 9/00671 |
| 2020/0195828 A1* | 6/2020 | Reyserhove | H04N 5/2353 |
| 2020/0195875 A1* | 6/2020 | Berkovich | H04N 5/23225 |
| 2020/0221243 A1* | 7/2020 | Schaefer | H04S 3/008 |
| 2020/0225473 A1* | 7/2020 | Selan | G02B 27/0093 |
| 2020/0226357 A1* | 7/2020 | Protter | G06T 7/277 |
| 2020/0228788 A1* | 7/2020 | Selan | G06F 3/0346 |
| 2020/0254876 A1* | 8/2020 | Cordell | B60K 37/06 |
| 2020/0288164 A1* | 9/2020 | Lin | H04N 21/44218 |
| 2020/0322748 A1* | 10/2020 | Han | H04N 21/233 |

FOREIGN PATENT DOCUMENTS

| | | |
|---|---|---|
| EP | 3070680 A1 | 9/2016 |
| WO | 2014144526 A2 | 9/2014 |
| WO | 2015098292 A1 | 7/2015 |

OTHER PUBLICATIONS

Szalavari, Z. et al., "'Studierstube' An Environment for Collaboration in Augmented Reality," CVE '96 Workshop Proceedings, Sep. 19, 1996, 15 pages.

Ohshima, T. et al., "AR2Hockey: A Case Study of Collaborative Augmented Reality," IEEE 1998 Virtual Reality Annual International Symposium, Mar. 14, 1998, 8 pages.

Billinghurst, M. et al., "A Wearable Spatial Conferencing Space," 2nd IEEE International Symposium on Wearable computers (ISWC '98), Oct. 19, 1998, 8 pages.

Billinghurst, M. et al., "Collaborative Mixed Reality," International Symposium on Mixed Reality (MR '99), Mar. 19, 1999, 14 pages.

Raskar, R. et al., "Table-Top Spatially-Augmented Reality: Bringing Physical Models to Life with Projected Imagery," Second IEEE and Acm International Workshop on Augmented Reality (IWAR '99), Oct. 20, 1999, 8 pages.

Ando, T. et al., "Head Mounted Display for Mixed Reality using Holographic Optical Elements," Memoirs of the Faculty of Engineering, Osaka City University, Dec. 1999, 6 pages.

Kato, H. et al., "Virtual Object Manipulation on a Table-Top AR Environment," International Symposium on Augmented Reality (ISAR 2000), Oct. 2000, 9 pages.

Benko, H. et al., "Collaborative Mixed Reality Visualization of an Archaeological Excavation," Third IEEE and ACM International Symposium on Mixed and Augmented Reality (ISMAR '04), Nov. 2, 2004, 9 pages.

Piekarski, W. et al., "Augmented Reality Working Planes: A Foundation for Action and Construction at a Distance," Third IEEE and ACM International Symposium on Mixed and Augmented Reality (ISMAR '04), Nov. 2, 2004, 10 pages.

Cosco, F. et al., "Visuo-Haptic Mixed Reality with Unobstructed Tool-Hand Integration," IEEE Transactions on Visualization and Computer Graphics, vol. 19, No. 1, Apr. 17, 2012, 14 pages.

"Canon Launches New MR (Mixed Reality) System, Contributing to Shorter Development Times During Product Design," Canon Global News Releases Website, Available Online at http://www.canon.com/news/2012/jun18e.html, Jun. 18, 2012, 3 pages.

"Unity Remote Coming to Google Cardboard SDK", Retrieved on: Jul. 14, 2015 Available at: http://www.ebuzzword.com/unity-remote-coming-to-google-cardboard-sdk.

Flynn, Scott, "Announcing Support for Microsoft Hololens", Published on: Apr. 29, 2015 Available at: http://blogs.unity3d.com/2015/04/29/announcing-support-for-microsoft-hololens/.

"Testing apps on the Gear2 Remotely", Published on: Apr. 22, 2014 Available at: http://developer.samsung.com/what-is-new/blog/2014/Testing-apps-on-the-Gear2-Remotely.

"About Remote Test Lab", Published on: Oct. 24, 2012 Available at: http://developer.samsung.com/remotetestlab/rtlAboutRTL.action.

"Creating and Running a Wearable App", Published on: Mar. 16, 2015 Available at: https://developer.android.com/training/wearables/apps/creating.html.

Helppi, Ville-Veikko, "App Development and Testing on Wearables", Published on: Mar. 31, 2015 Available at: http://testdroid.com/news/app-development-and-testing-on-wearables.

(56) References Cited

OTHER PUBLICATIONS

Lins, et al., "Development of Interactive Applications for Google Glass", In Proceedings of Trends and Techniques in Virtual and Augmented Reality, vol. 4, May, 2014, pp. 167-188.

Southard, Don, "Xcode 6: Live Rendering, Visual View Debugging, and Swift", Published on: Sep. 18, 2014 Available at: http://www.macstories.net/mac/xcode-6-live-rendering-visual-view-debugging-and-swift/.

"The Challenges of Creating a VR Application", Retrieved on: Jul. 14, 2015 Available at: http://www.middlevr.com/resources/the-challenges-of-creating-a-vr-application/.

"Hierarchy Viewer Walkthrough", Retrieved on: Jul. 14, 2015 Available at: https://developer.android.com/tools/performance/hierarchy-viewer/index.html.

"Develop for Google Glass—10 Steps for a Quick Start", Published on: May 12, 2013 Available at: http://glass-apps.org/glass-developer.

ISA European Patent Office, International Search Report and Written Opinion Issued in PCT Application No. PCT/US2016/013127, dated Apr. 1, 2016, WIPO, 14 pages.

IPEA European Patent Office, Second Written Opinion Issued in PCT Application No. PCT/US2016/013127, dated Dec. 12, 2016, Wipo, 10 pages.

ISA European Patent Office, International Search Report and Written Opinion Issued in PCT Application No. PCT/US2016/057565, dated Jan. 30, 2017, WIPO, 13 pages.

Gamez, et al., "Wireless Network Delay Estimation for Time-Sensitive Application", Retrieved From: <<https://web.archive.org/web/20160528074506/https://people-esaii.upc.edu/people/pmarti/nde_06.pdf>, Jul. 27, 2006, 13 Pages.

Ananda, et al., "Estimation of Round Trip Time in Distributed Real Time System Architectures", In Proceedings of the Australasian Telecommunication Networks and Applications Conference (ATNAC), Nov. 20, 2013, pp. 57-62.

"Second Written Opinion Issued in PCT Application No. PCT/US2016/057565", dated Sep. 5, 2017, 9 Pages.

"International Preliminary Report on Patentability Issued in PCT Application No. PCT/US2016/057565", dated Jan. 31, 2018, 10 Pages.

"Office Action Issued in European Patent Application No. 16790809.4", dated Apr. 18, 2019, 7 Pages.

"Summon to Attend Oral Proceedings Issued in European Patent Application No. 16790809.4", Mailed Date: Mar. 13, 2020, 14 Pages.

"First Office Action and Search Report Issued in Chinese Patent Application No. 201680062861.X", dated Aug. 3, 2020, 20 Pages.

* cited by examiner

US 10,962,780 B2

REMOTE RENDERING FOR VIRTUAL IMAGES

BACKGROUND

A variety of augmented and virtual reality devices exist which are usable for generating and viewing interactive virtual imagery. Such virtual imagery may include information displays, content windows, user interfaces, artificially intelligent virtual entities, 3D models, and other virtual objects. Virtual imagery may be world-locked so as to make it appear that virtual objects remain in a fixed location in the real world.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One or more sensors of a virtual reality device track a pose of the virtual reality device. The virtual reality device requests a virtual image having a perspective corresponding to a future pose from a remote computer. After receiving the requested virtual image, the virtual reality device adjusts the virtual image to an adjusted virtual image having an updated perspective corresponding to an updated tracked pose of the virtual reality device. Then, a virtual reality display displays the adjusted virtual image.

DETAILED DESCRIPTION

Figure 1:
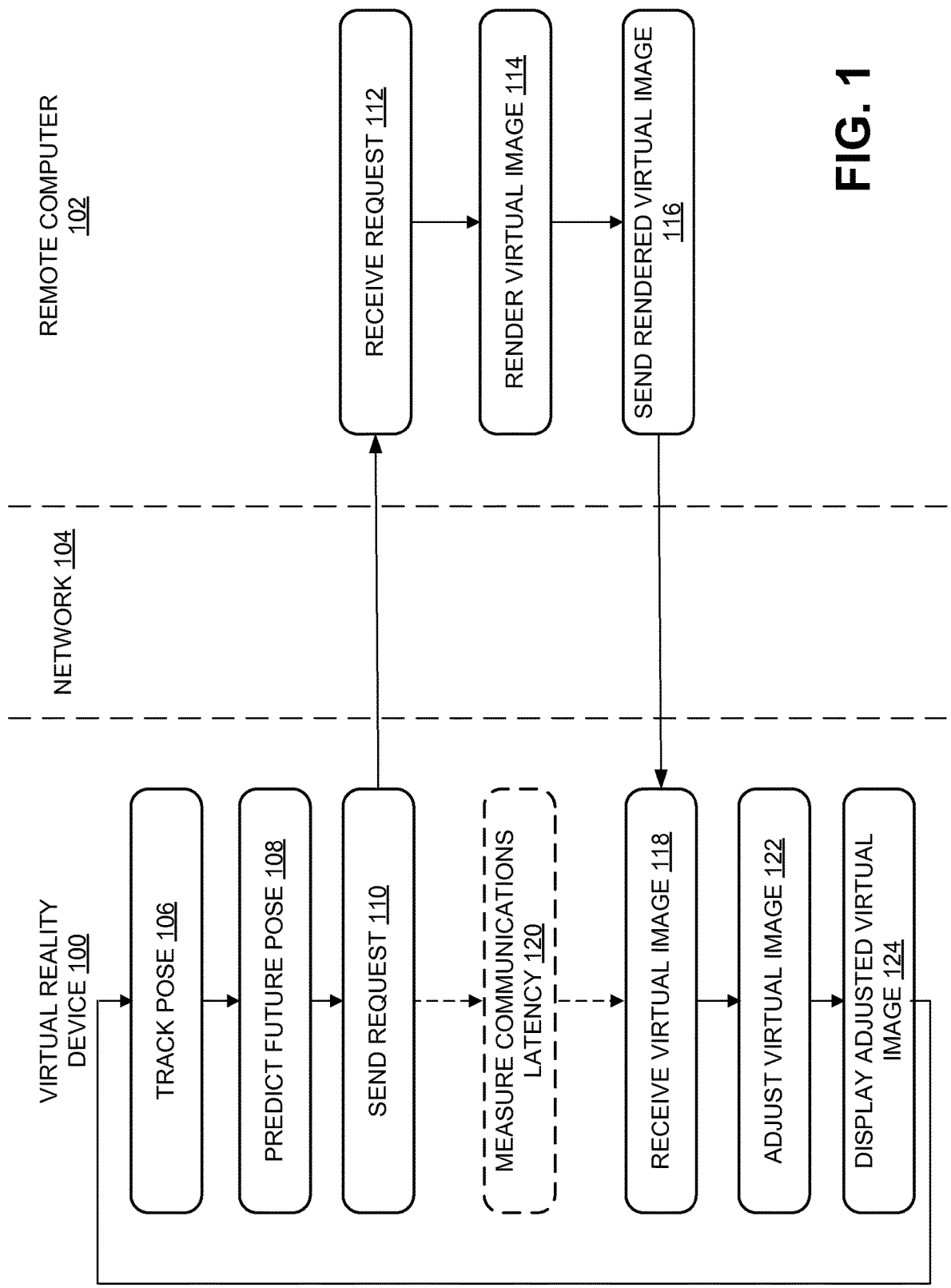
FIG. 1 is a flowchart of a process for locally requesting and displaying remotely rendered virtual images.

When using a virtual reality device, it may sometimes be desirable to outsource some or all rendering of virtual images to a remote computer. In such cases, a virtual reality device may send to a remote computer a request for a virtual image. The remote computer may then render the virtual image, and send it to the virtual reality device for display. Remote rendering of virtual images may present several advantages over local rendering, as will be explained in more detail below. However, remote rendering may also introduce delay between when a virtual image is requested and when the virtual image is actually displayed, potentially resulting in a less satisfactory user experience. Virtual images displayed by a virtual reality device may be substantially "world-locked," such that the virtual images appear to occupy specific positions in physical space which do not change as the perspective of the virtual reality device changes. In order to maintain this effect, rendered virtual imagery must appear to update substantially simultaneously as a user moves. For example, as a user moves to the left, a rendered virtual image may need to simultaneously shift a proportional distance to the right, so as to appear not to move relative to the real world. Delays in image rendering introduced by remote rendering can compromise this effect, resulting in "jittery" or "swimmy" images. As discussed below, these effects can be lessened by recognizing the time necessary to request and receive a remotely-rendered virtual image, and requesting the virtual image for a corresponding time in the future.

Remote rendering of virtual images may be useful in any number of potential scenarios. For example, the virtual images to be rendered may be complex, and require substantial computer resources for rendering and/or manipulation. In such cases, rendering of virtual images may be outsourced to a remote computer with greater image rendering and/or general processing capabilities than the virtual reality device.

In another example, remote rendering may be useful for reducing iteration time and/or testing code changes during software development. An application developer may use a remote computer to write a software application executable by a virtual reality device. During application development, the developer may test aspects of the software application by executing it on a remote computer configured to send rendered imagery to a virtual reality device. The remote computer may have one or more tools/features useful for application development which are not available/easily accessible on the virtual reality device. The developer may use the virtual reality device during this process, evaluating and/or interacting with the rendered virtual imagery. This may allow the application developer to test software changes substantially in real time, eliminating the need to compile and install new software builds on the virtual reality device before testing can occur. In some embodiments, the developer may be able to make changes to the software application by interacting with one or more virtual elements via the virtual reality device, thereby affecting the software running on the remote computer.

FIG. 1 illustrates a flowchart of an example process for remotely rendering virtual images while lessening lag/latency perceived by a user. Virtual reality device 100 may be any device suitable for requesting and displaying virtual images, including but not limited to: virtual reality and/or augmented reality-glasses, -goggles, -contact lenses, -helmets, -heads-up displays (HUDs), -hologram generators, -projectors, and/or any other suitable devices. Virtual reality device 100 may utilize an opaque display, thereby obscuring a wearer's view of their real-world environment in favor of a rendered virtual reality (VR) environment. Alternately, virtual reality device 100 may utilize a transparent or see-thru display, configured to present an augmented reality (AR) environment, in which virtual objects are viewable along with real-world objects. Remote computer 102 may include any suitable computer system, including but not limited to one or more a: desktop computer, laptop computer, smartphone, tablet computer, wearable computer, and/or server computer. Further, network 104 may be any suitable computer network including, for example, the Internet, and/or any local wired/wireless computer networks with bandwidth sufficient for transmitting rendered virtual images. Virtual reality device 100 and remote computer 102 may occupy separate network nodes on network 104. Virtual reality device 100 and/or remote computer 102 may be implemented as one or more computer systems as described below with respect to FIG. 8.

At 106, one or more sensors track a pose of the virtual reality device. A pose may be defined as a set of variables establishing the virtual reality device's position and/or orientation at a specific moment in time. Such variables may include the device's current three-dimensional coordinates (e.g., X, Y, and Z coordinates), comprising three degrees of freedom (3DOF). Further, the one or more sensors may track the virtual reality device's current pitch, roll, and yaw, providing an additional three degrees of freedom (3DOF), for a combined six degrees of freedom (6DOF). In some embodiments, the one or more sensors are configured to detect a motion of the virtual reality device in one or more dimensions. For example, if a user of a wearable virtual reality device walks forward, moves his head, leans backward, and/or moves in any other way, the one or more sensors may detect the motion and continuously update the tracked pose. The one or more sensors may comprise one or more gyroscopes, accelerometers, proximity sensors, optical sensors, infrared sensors, ultrasonic sensors, microphones, global positioning system (GPS) receivers, cameras, thermometers, barometers, and/or any other suitable sensors.

At 108, a pose prediction machine of virtual reality device 100 predicts a future pose of the virtual reality device at a future time. The future time may be any suitable time in the future, and may be established according to one or more criteria, as described in further detail below. In particular, the future time may be separated from the current time by a buffer period, and the size of the buffer period may depend upon one or more factors. The future pose is the pose prediction machine's prediction of what the pose of virtual reality device 100 will be at or near the future time, according to the device's current pose, movement, and/or other factors, as will be explained below.

In order to predict the future pose, the pose prediction machine may make use of the virtual reality device's current pose and movement, as tracked by the one or more sensors. Then, the pose prediction machine may extrapolate the detected motion forward from the current time to the future time, thus generating a reasonable approximation of the position and/or orientation the virtual reality device 100 is likely to have at or near the future time. For example, if the one or more sensors determine that, at a current time, virtual reality device 100 is moving slowly to the left, then the pose prediction machine may predict a future pose of the virtual reality device by extrapolating the device's leftward motion until the future time.

In some embodiments, other factors may be considered when predicting the future pose of virtual reality device 100. For example, when virtual reality device 100 is worn by a user, the future pose may be predicted by extrapolating the detected motion forward with biomechanical constraints. This may include determining that a detected motion is consistent with a predictable human movement such as nodding, head turning, bending at the waist, jumping, etc., and using this information to more accurately predict the future motion and resulting pose. For example, the pose prediction machine may determine that a detected motion is consistent with a user turning his head. Based on the duration and speed of the detected head turn, the pose prediction machine may determine a likely future pose extrapolated from the current pose and detected head-turning motion.

Further, the pose prediction machine may predict the future pose by extrapolating the detected motion forward with environmental constraints. This may include identifying one or more real-world/virtual objects, features, elements, and/or other points of interest that a user is likely to focus on. For example, if the pose prediction machine determines that a user is turning his head to look at a nearby television set, the pose prediction machine may predict that the user will focus on the television set, and therefore predict the future pose according to an assumption that the detected motion will stop once the television set is in the center of the user's field of view. Similar predictions can be made for virtual objects. For example, the pose prediction machine may determine that a user is tilting his head upward toward a world-locked virtual monitor, and predict the future pose accordingly. Alternatively, the pose prediction machine may determine that there are no notable points of interest in the path of the detected motion, and use this information when predicting the future pose.

In the illustrated example, the pose prediction machine is shown as being part of the virtual reality device. However, in some embodiments, the pose prediction machine may be part of the remote computer. For example, the virtual reality device may send to the remote computer data from the one or more sensors, and the pose prediction machine of the remote computer may predict the future pose of the virtual reality device based on the sensor data, as described above.

At 110, a communications machine of the virtual reality device sends to the remote computer a request for a virtual image. Specifically, the virtual reality device requests a virtual image having a perspective corresponding to the future pose of the virtual reality device. In other words, after the pose prediction machine predicts the future pose, the communications machine requests that the remote computer render one or more virtual images from the predicted perspective of the virtual reality device.

In some embodiments, the request may specify one or more virtual images consistent with one or more points of view. For example, the virtual reality device may request two virtual images with slightly different perspectives, one to be displayed for a user's left eye, and one to be displayed for a user's right eye. Additional perspectives may also be requested, for example from the point of view of one or more cameras attached to the virtual reality device and/or present in the real-world environment. Further, the request may specify that rendered virtual images have a certain resolution and/or size. This resolution may match a resolution of a display device by which the virtual image will be displayed, or the requested resolution may be different from (e.g., greater or less than) the resolution of the display device, as will be explained in further detail below with respect to FIG. 3.

Virtual reality device 100 sends the request to remote computer 102 over network 104. As described above, network 104 may be virtually any suitable computer network including, for example, the Internet and/or a local area network (LAN). As such, when communicating over the computer network, each of the virtual reality device and the remote computer occupy a different network node. The virtual reality device and the remote computer may be separated by virtually any physical distance, provided they are able to communicate over the computer network.

At 112, a remote communications machine of the remote computer receives from a virtual reality device a request for a virtual image. As described above, the request is for one or more virtual images having a perspective corresponding to a predicted future pose of the virtual reality device.

At 114, a virtual image renderer of the remote computer renders the virtual image for the virtual reality device as specified by the request.

At 116, the remote communications machine of the remote computer sends to the virtual reality device the rendered virtual image. In some embodiments, the virtual image may be compressed and/or otherwise modified prior to sending. This may be done, for example, responsive to a transmission speed and/or maximum bandwidth of the computer network.

In some embodiments, information pertaining to the predicted future pose may be attached to the rendered virtual image before it is sent to the virtual reality device. This may permit a virtual reality device to determine which rendered virtual images correspond to which predicted future poses. Further, in the case where the pose prediction machine is located at the remote computer, sending pose information with the rendered virtual image may allow the virtual reality device to determine the future pose for which the virtual image was rendered. This information may be linked to the rendered virtual images in any suitable way. For example, the pose information may simply be appended to each network packet including rendered virtual imagery. Alternately, pose information may be encoded within each network packet as pixel data associated with the rendered virtual imagery. Pixels including pose information may be cleared to black once decoded by the virtual reality device. Further, pose information may be indexed according to integer identifiers and tracked by one or more computer devices via, for example, a send and lookup method.

At 118, the communications machine of the virtual reality device 100 receives from the remote computer the virtual image. Upon receipt of the virtual image, the virtual reality device may perform one or more processing/analysis steps in order to, for example, decompress the received virtual image and/or otherwise modify it before additional operations are performed.

At 120, after the rendered virtual image has been received, the communications machine of the virtual reality device 100 determines a communications latency of the computer network by measuring an elapsed time between the request being sent and the virtual image being received. This communications latency may be used in future decisions regarding how virtual images should be rendered. For example, as described above, the pose prediction machine predicts the future pose of the virtual reality device at a future time, and this future time is separated from the current time by a buffer period. In some embodiments, the pose prediction machine may be configured to dynamically adjust the buffer period by dynamically increasing the buffer period with increasing communications latency and dynamically decreasing the buffer period with decreasing communications latency. A high communications latency may indicate relatively slow communication between the virtual reality device and the remote computer over the computer network. As such, the pose prediction machine may need to predict the future pose for a future time which is relatively far in the future, in order to account for the time it will take before a requested virtual image has been remotely rendered and received. However, when the communications latency is low, the pose prediction machine may be able to predict the future pose for a future time which is relatively closer to the current time, thereby increasing the accuracy of the prediction. Further, the current framerate for display of virtual images may be adjusted based on communications latency, and the communications latency may be taken into account when establishing a resolution of virtual images. For example, in cases of high communications latency, framerate and virtual image resolution may be dynamically reduced, in order to minimize network congestion related latency/delays.

At 122, a late stage reprojection machine of the virtual reality device 100 adjusts the virtual image before it is displayed. Such late stage reprojection can lessen any noticeable effects resulting from the pose prediction engine predicting the wrong pose. Specifically, the rendered virtual image, which has a perspective corresponding to the predicted future pose, may be adjusted to have an updated perspective corresponding to an updated tracked pose of the virtual reality device. For example, before a virtual image is requested, the one or more sensors may determine that the virtual reality device is moving to the left, and the pose prediction machine may use this information to predict a future pose where the virtual reality device has moved somewhat to the left relative to the current pose. Then, a virtual image having this perspective may be requested. However, after requesting the virtual image, the one or more sensors may determine that the leftward motion has stopped sooner than expected, and as a result, the rendered virtual image will not match the actual pose of the device at the future time. As such, if the rendered virtual image was displayed to a user unmodified, virtual objects within the virtual image may appear to suddenly move away from their world-locked positions. To solve this problem, the late stage reprojection machine may adjust the image by shifting the virtual image by an amount that is proportional to a difference between the predicted future pose and the updated tracked pose. Given the above example, the late stage reprojection machine may slightly shift the virtual image in order to compensate for the change in the virtual reality device's motion, ensuring that, from the user's perspective, world-locked virtual objects remain in their designated positions.

In some embodiments, the updated tracked pose used by the late stage reprojection machine will be the last possible pose which can be used before the virtual image is displayed, so as to ensure that the virtual image is adjusted according to the most recent possible information. The updated tracked pose used to adjust the rendered virtual image may represent the virtual reality device's position and/or orientation at a time either before the virtual image has been received, or after the virtual image has been received and before it is displayed. In some embodiments, the pose prediction machine may begin continuously comparing the most recent updated tracked pose to the predicted future pose as soon as the virtual image is requested, dynamically determining which adjustments need to be made to the rendered virtual image before it is displayed.

At 124, a virtual reality display of the virtual reality device 100 displays the adjusted virtual image at or near the future time. Once the rendered virtual image has been received and adjusted by the late stage reprojection machine, it is displayed at or near the future time using the virtual reality display. Virtual reality device 100 may incorporate virtually any type of display usable for displaying rendered virtual imagery.

Once the adjusted virtual image is displayed, the process described above repeats. The pose prediction machine uses the new current pose to predict a new future pose, and the communications machine requests a new rendered image for the new future pose. In some embodiments, the process described above is continuously repeating, such that at any given moment in time, multiple steps of the process are being carried out simultaneously. For example, at the same time a virtual image is being displayed by the virtual reality display, new future poses are being predicted, and new virtual images are being requested, rendered, and adjusted.

Figure 2:
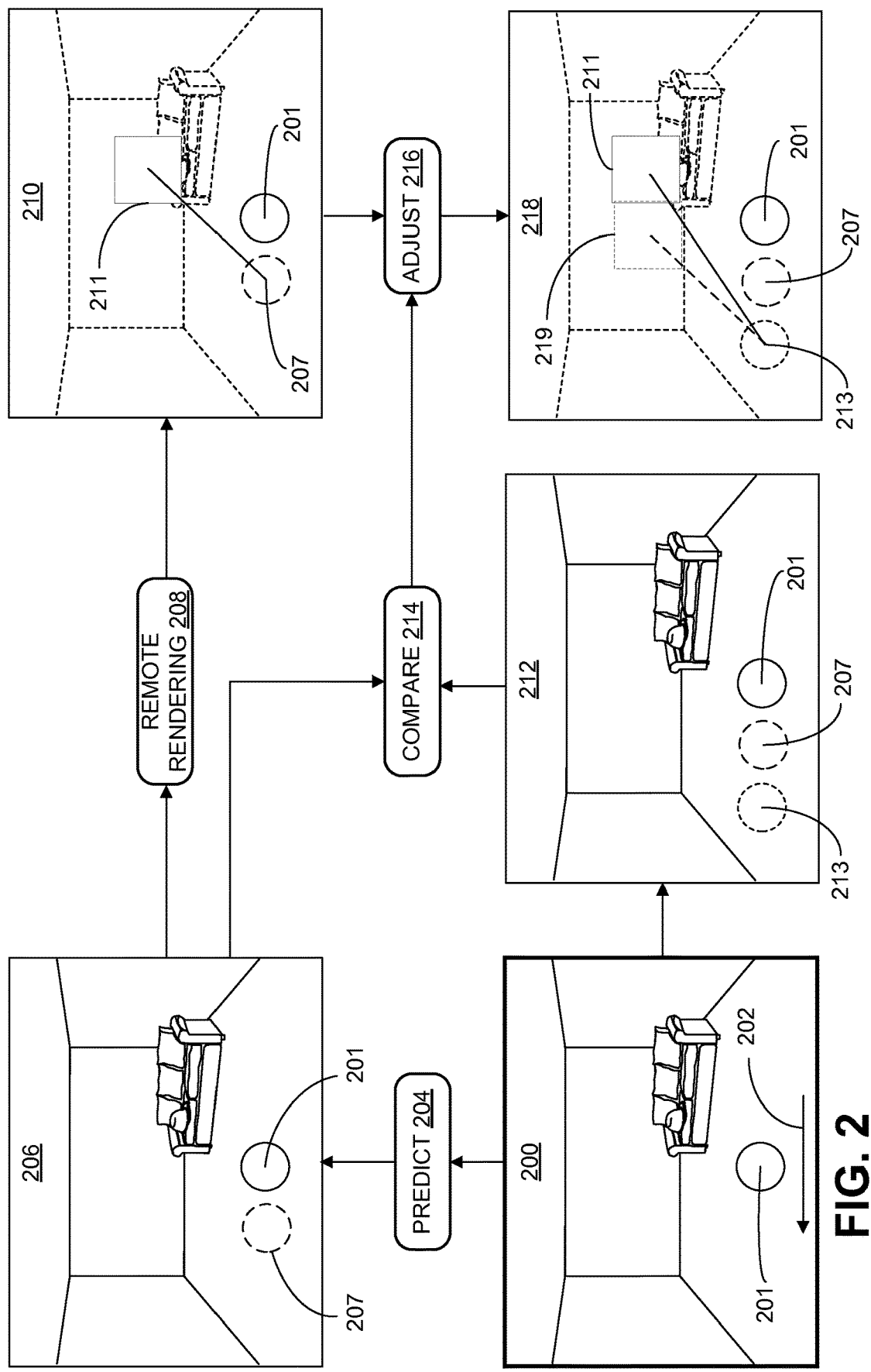
FIG. 2 illustrates an example process for locally requesting and displaying remotely rendered virtual images.

FIG. 2 illustrates aspects of the process outlined above with respect to FIG. 1. First, at 200, the one or more sensors determine a current pose 201 of a virtual reality device. The current 6DOF pose 201 is simplified as a circle in FIG. 2. The one or more sensors further detect a motion of the virtual reality device. In FIG. 2, the virtual reality device is moving to the left, as indicated by movement arrow 202.

At 204, the pose prediction machine uses current pose 201 and the detected movement indicated by arrow 202 to predict a future pose of the virtual reality device. Such a prediction may be made as described above with respect to FIG. 1. For example, the pose prediction machine may predict the future pose by extrapolating the detected motion forward from the current time to the future time. This extrapolation may further comprise extrapolating the detected motion forward with biomechanical and/or environmental constraints.

Next, at 206, FIG. 2 shows current pose 201 of the virtual reality device, and also shows a predicted future 6DOF pose 207 of the virtual reality device, simplified as a dashed circle. Specifically, predicted future pose 207 is shown to the left of current pose 201, given that the motion detected by the one or more sensors was to the left.

At 208, a virtual image is rendered at a remote computing device according to predicted future pose 207. Virtual image rendering may occur at the remote computing device according to the process described above with respect to FIG. 1.

Next, at 210, FIG. 2 shows the predicted future pose 207 of the virtual reality device, and also shows a world-locked virtual object 211 present in the rendered virtual image. The real-world environment of the virtual reality device is shown in dashed lines at 210, so as to differentiate real-world objects from world-locked virtual object 211. A solid line connects predicted future pose 207 to virtual object 211, indicating the angle at which the world-locked virtual object will appear relative to the virtual reality device. The angle between the virtual reality device and the world-locked virtual object is dynamically set such that the position of the world-locked virtual object appears to be the same, even as the virtual reality device moves.

Advancing in time from 200, at 212, FIG. 2 shows an updated tracked pose 213 of the virtual reality device, simplified as a dashed circle. Updated tracked pose 213 indicates the most recently updated position and/or orientation of the virtual reality device. Also at 212, FIG. 2 shows pose 201, indicating the former position and/or orientation of the virtual reality device, and predicted future pose 207. Notably, updated tracked pose 213 is shown to the left of predicted future pose 207, indicating that the virtual reality device has moved farther to the left than was predicted at 204.

At 214, after the future pose has been predicted and updated tracked pose 213 has been determined, the late stage reprojection machine compares the predicted future pose to the updated tracked pose. In this case, the late stage reprojection machine will identify differences in position and/or orientation between predicted future pose 207 and updated tracked pose 213. As described above, in some embodiments, once the rendered virtual image has been requested, the late stage reprojection machine may continuously compare the updated tracked pose to the predicted future pose, in order to determine which if any adjustments should be made to the received virtual image before it is displayed.

Next, at 216, the late stage reprojection machine uses the results of the comparison performed at 214 to adjust the rendered virtual image to have an updated perspective corresponding to the updated tracked pose 213 of the virtual reality device. Such adjustment may comprise shifting the virtual image by an amount that is proportional to a difference between the predicted future pose and the updated tracked pose. In the illustrated example, the late stage reprojection machine may shift the rendered virtual image in order to account for the differences in position and/or orientation of the virtual reality device between the predicted future pose 207 and the updated tracked pose 213.

Finally, at 218, FIG. 2 shows the world-locked virtual object 211, updated tracked pose 213, former pose 201, and predicted future pose 207. The real-world environment of the virtual reality device is shown in dashed lines, so as to differentiate between the real-world objects and world-locked virtual object 211. A solid line connects the updated tracked pose 213 to the world-locked virtual object 211, indicating the angle at which the world-locked virtual object appears relative to the virtual reality device. As can be seen by comparing 218 to 210, the angle between the virtual reality device and the world-locked virtual object 211 has changed such that the world-locked virtual object still appears to occupy the same position, even though the virtual reality device has a different pose than the one for which the virtual image was rendered.

Also shown at 218 is a non-adjusted position 219 of the world-locked virtual object, shown as a dashed box. The virtual reality device does not display the world-locked virtual object at position 219 in the adjusted virtual image. Rather, it is included in FIG. 2 in order to indicate the position at which the world-locked virtual object would appear, if the rendered virtual image was not adjusted by the late stage reprojection machine before display. Position 219 is shown to the left of world locked virtual image 211, indicating that the late stage reprojection machine adjusted the virtual image by shifting it to the right, in response to the difference in position and/or orientation between the predicted future pose 207 and the updated tracked pose 213.

In some embodiments, an environment of a virtual reality device may include virtual objects which are too large to fit within a field of view (FOV) of the virtual reality device, or are located entirely outside of the current FOV. For example, a user of a virtual reality device may play a game requiring the user to interact with a large virtual dragon. The dragon may be too large to fit entirely within the FOV of the virtual reality device, meaning a virtual image rendered for a given pose of the virtual reality device may not include the entire dragon, and instead only include the portions of the dragon which are currently visible in the FOV. Similarly, a user may interact with a virtual object, anchoring it to a particular location in the physical world, then move such that the virtual object is no longer visible within the virtual reality device's current FOV. As such, a virtual image rendered for a given pose of the virtual reality device may only include the virtual object when it is within the device's current FOV.

During remote rendering, virtual images may be rendered based on which virtual objects would be visible to a virtual reality device occupying a predicted future pose at a future time. For example, at a predicted future pose, an FOV of a virtual reality device may include only the head of a virtual dragon. As a result, a virtual image rendered for the predicted future pose may include only the dragon's head. However, this may pose a problem if, at an updated tracked pose, the FOV of the virtual reality device includes an area which should be occupied by a neck/body of the virtual dragon. The late stage reprojection machine could adjust the rendered virtual image in order to compensate for any differences between the predicted future pose and the updated tracked pose. However, this may not be possible if the rendered virtual image only includes the dragon's head, for example. Adjusting the virtual image may move the head of the dragon to a position consistent with the updated tracked pose, though leave blank space where the dragon's neck and body should be.

Figure 3:
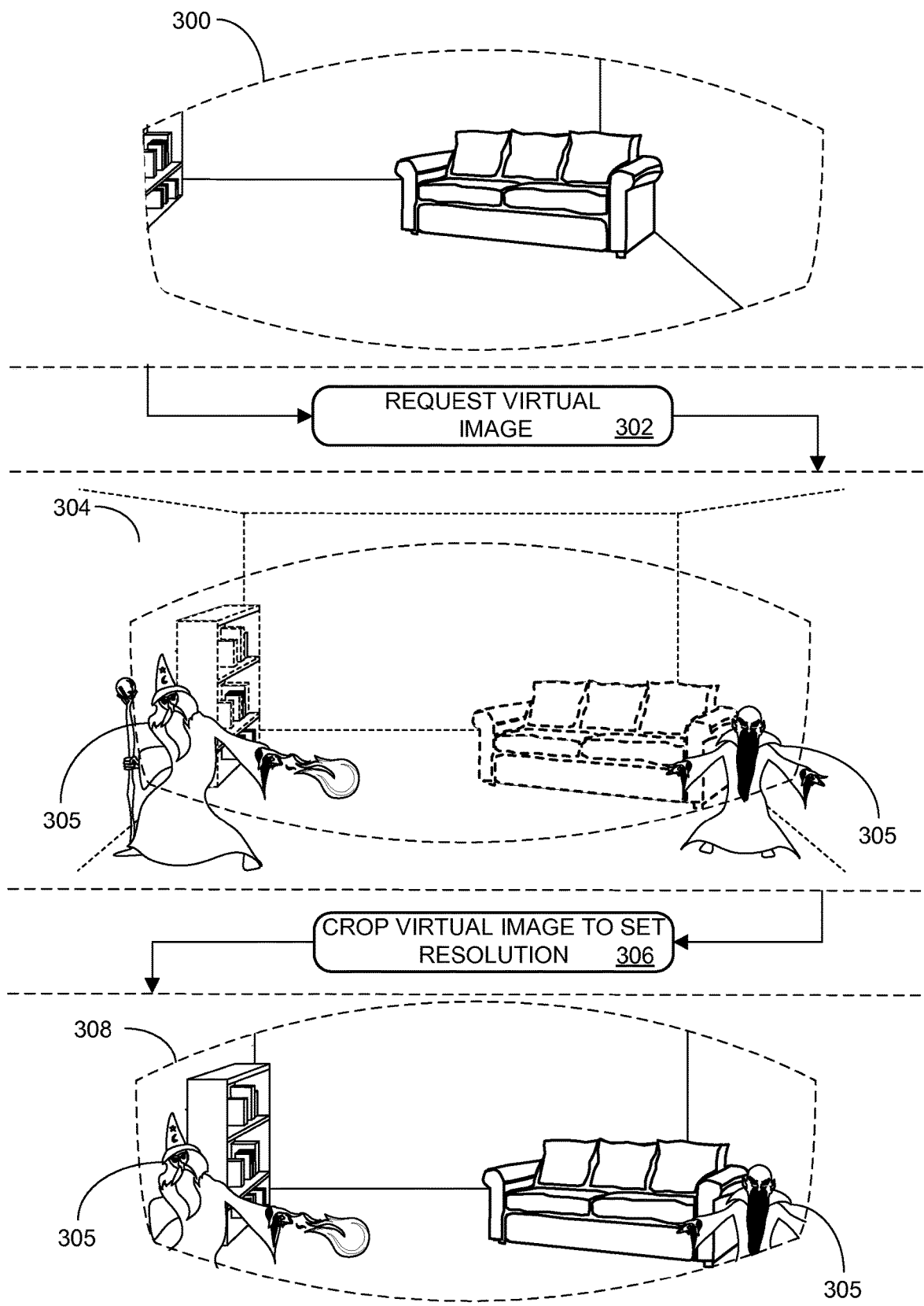
FIG. 3 illustrates an example method of oversizing and cropping rendered virtual images.

In order to address this problem, a virtual image may be rendered which is oversized relative to a set resolution of a virtual reality display, then cropped to match the set resolution before the virtual image is displayed. FIG. 3 illustrates this process. FIG. 3 shows a current FOV 300 of a virtual reality device. The dashed line indicates the edge of the virtual reality device's current FOV. In the illustrated embodiment, the FOV of the virtual reality device is identical to the FOV of a user of the virtual reality device. However, in some embodiments, the FOV of the virtual reality device may be smaller than the FOV of the user. In such embodiments, real-world objects may extend beyond the dashed line boundary of the virtual reality device FOV. In other embodiments, the FOV of the virtual reality device may be larger than the FOV of the user. Additional real-world and/or virtual objects may be present in the current environment of the virtual reality device which are not currently visible in the FOV.

At 302, the virtual reality device requests a rendered virtual image. The rendered virtual image may be oversized relative to the set resolution of the virtual reality display. In some embodiments, virtual images may be automatically oversized at least to a degree, in order to ensure that adjustments can be made in the event that the predicted future pose does not match the updated tracked pose. Alternately, images may only be oversized when a threshold motion is detected by the one or more sensors. Further, an amount of oversizing may be proportional to a speed of the detected motion, the current framerate, and/or an average variation in network latency.

At 304, FIG. 3 shows an oversized virtual image, as rendered by a remote computer. Objects in the real-world environment of the virtual reality device are drawn with fine dashed lines, so as to differentiate real-world objects from virtual objects. As shown, the virtual reality device is configured to display an image having a set resolution, and the virtual image is oversized relative to the set resolution.

The oversized virtual image includes virtual wizards 305. Each virtual wizard is fully rendered by the remote computer, despite the fact that only part of each virtual wizard may be visible in the virtual reality device's FOV. Further, the virtual image is shown as being oversized in two dimensions—a horizontal dimension and a vertical dimension. However, in some embodiments, a degree of oversizing may be different in different dimension. For example, an amount of oversizing in a first dimension of the virtual image may be proportional to a speed of the detected motion in the first dimension, and an amount of oversizing in a second dimension of the virtual image may be independently proportional to a speed of the detected motion in the second dimension. For example, if a virtual reality device is moving rapidly in a horizontal direction, and slowly in a vertical dimension, a rendered virtual image may be greatly oversized in a horizontal dimension, and only slightly oversized in a vertical dimension. Dynamically setting the amount of oversizing according to detected motion may allow a virtual reality device to shift virtual images as necessary for proper display, without wasting resources by rendering unnecessarily large virtual images.

At 306, the virtual reality device adjusts the rendered virtual image before it is displayed. In this case, adjusting the virtual image comprises cropping the virtual image to the set resolution of the virtual reality display. At this time, the late stage reprojection machine may perform any other adjustment operations before the virtual image is displayed. For example, the late stage reprojection machine may shift the virtual image in order to account for differences between the predicted future pose and the updated tracked pose.

Next, FIG. 3 shows an updated FOV 308 of the virtual reality device. The late stage reprojection machine has cropped the rendered virtual image 304 to the set resolution of the virtual reality display. As illustrated, only those portions of virtual wizards 305 which are visible within the FOV are displayed, even though each virtual wizard was rendered in its entirety as part of the oversized virtual image. After adjustment, the cropped virtual image will be displayed by the virtual reality display at or near the future time corresponding to the previously predicted pose.

Alternatively, a virtual image may be rendered which is undersized relative to a set resolution of a virtual reality display. Such images may be rendered and displayed in a similar manner to the oversized virtual images described above. For example, an undersized virtual image may be rendered which has a resolution which is less than the set resolution of the virtual reality display, and then stretched to fit the size of the virtual reality display. This may help maintain a constant framerate during periods of network congestion and high communications latency. An amount of undersizing may be proportional to a speed of the detected motion, the current framerate, and/or an average variation in network latency.

In some embodiments, a rendered virtual image may be oversized relative to a size of a virtual reality display, though use the same resolution as the virtual reality display. In such a scenario, each pixel of the oversized virtual image will cover a larger area than a pixel from a rendered virtual image which is the same size as the virtual reality display. In some embodiments, such blurring may be desirable. For example, in the event that a virtual reality device is moving, a blurred virtual image may be rendered, simulating a motion blur effect. In some embodiments, additional operations may be performed in order to perform smoothing of a blurred virtual image before it is displayed.

Figure 4A:
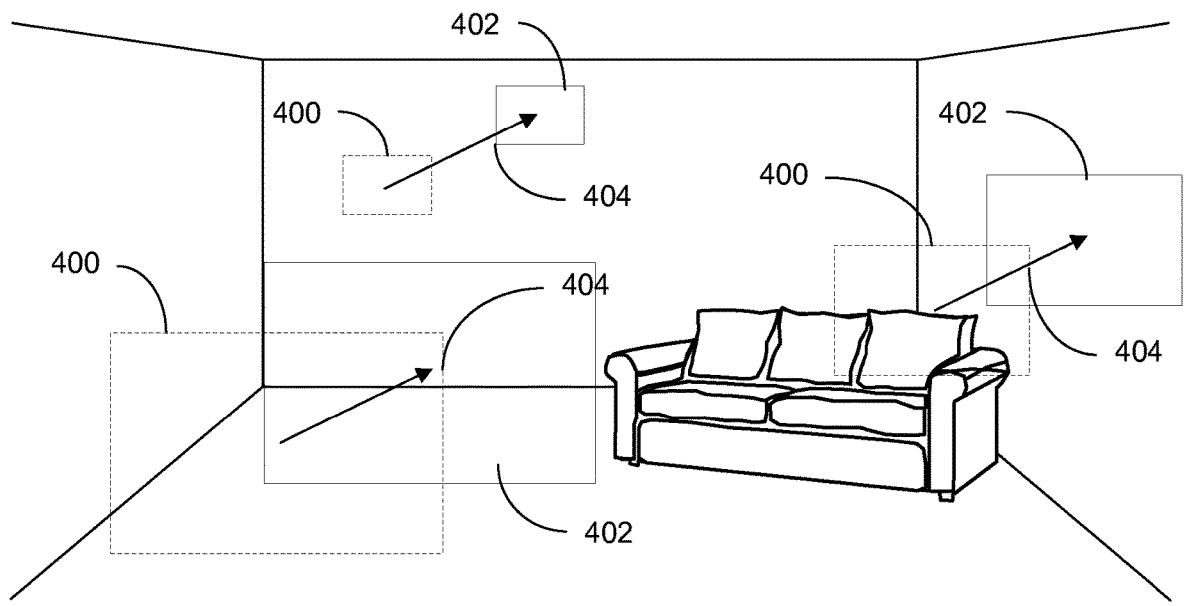
FIGS. 4A and 4B illustrate shifting of virtual images responsive to detected motion.

FIG. 4A illustrates shifting of virtual objects. In this example, the virtual image is a two-dimensional image including color information (an RGB image). Further, the virtual image includes virtual objects that are intended to be world-locked, such that they remain in approximately the same position relative to each other and to the real-world environment even as a virtual reality device moves. Specifically, FIG. 4A includes virtual object original positions 400, updated virtual object positions 402, and virtual object shift indicators 404. In the illustrated example, a virtual reality device has recently moved slightly downward and to the left, and as a result, the virtual image has shifted slightly up and to the right in the virtual reality device's FOV, thereby compensating for differences between the predicted future pose and the updated tracked pose. Virtual objects may be rendered to have a virtual depth (i.e., simulated distance from the virtual reality device). However, because the virtual image is a two-dimensional image, individual virtual objects are not shifted independently. Rather, the entire virtual image is shifted, meaning each virtual object is shifted the same display distance (i.e., number of pixels), regardless of virtual depth.

In some embodiments, the virtual image is a three-dimensional image, and includes a number of virtual objects, each rendered to appear at a different distance away from the virtual reality device. The rendered virtual image may include color and depth information (an RGBD image). For example, in addition to one or more color values used to illuminate the display (e.g., RGB values), each pixel may also include underlying depth information (e.g., D value) which is not displayed, but which can be used to position the individual virtual objects on the display if the predicted pose differs from an updated tracked pose.

Figure 4B:
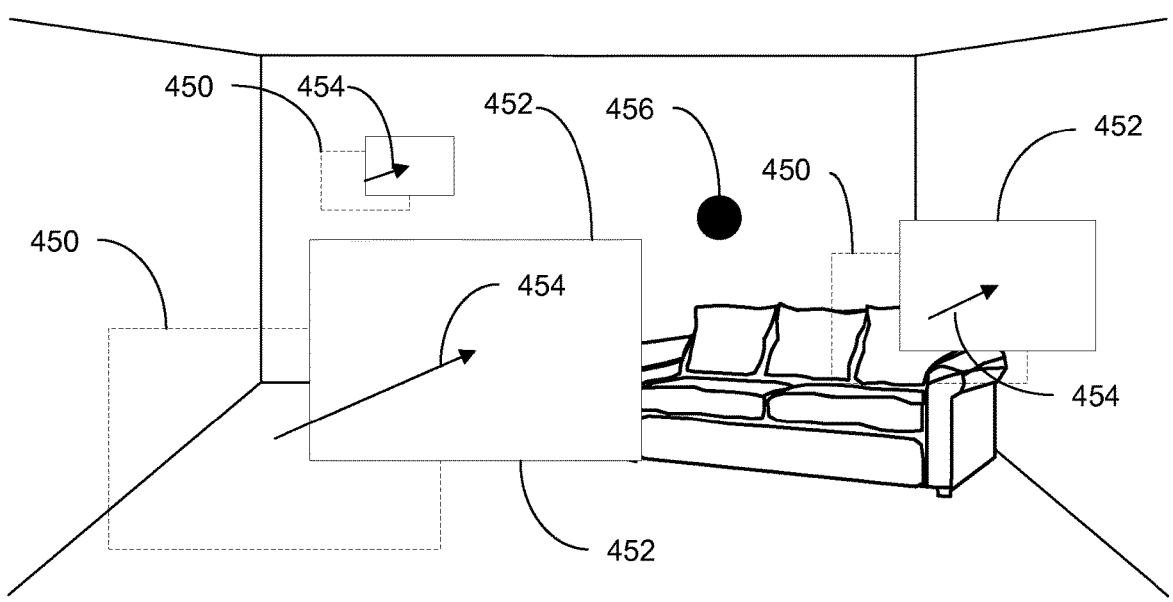

FIG. 4B illustrates shifting of virtual objects consistent with adjusting a three-dimensional RGBD image. Similar to FIG. 4A, FIG. 4B includes virtual object original positions 450, virtual object updated positions 452, and virtual object shift indicators 454. However, in this example, adjusting the virtual image comprises independently shifting different aspects of the three-dimensional virtual image by an amount that is proportional to a difference between the predicted future pose and the updated tracked pose. Adjusting the virtual image may further comprise independently shifting each particular aspect of the three-dimensional virtual image by an amount that is inversely proportional to a virtual depth of the particular aspect. This can be seen in FIG. 4B, as each virtual object has shifted a different distance responsive to movement of the virtual reality device. Specifically, virtual objects which have a smaller virtual depth have shifted a greater distance than virtual objects which have a greater virtual depth, consistent with a parallax effect.

One or more virtual objects optionally may be locally rendered on the virtual reality device while other virtual objects are remotely rendered on the remote computer. In such embodiments, the virtual reality device may include a local virtual image renderer configured to locally render one or more virtual objects. Further, in such embodiments, the virtual reality display may be configured to display the one or more virtual objects rendered by the local virtual image renderer with the adjusted virtual image. This may be done for a variety of reasons. For example, relatively simple virtual objects may be rendered by a virtual reality device, while more complicated objects may be rendered remotely. Further, virtual objects with relatively low latency tolerance including, for example, cursors, may be rendered locally, where rendering can be done without network associated communications latency. For example, FIG. 4B includes cursor 456. In some embodiments, cursor 456, and/or other virtual objects, may be rendered locally by a local image renderer, while other virtual objects are rendered remotely. The bifurcation of local and remote rendering can be performed with 2D and/or 3D virtual images.

In some embodiments, the remote computer may render a three-dimensional image and transmit it to the virtual reality device for adjustment and display. However, in the event of low network bandwidth/other network delays, or if the remote computer is unable to render virtual images at a framerate defined by the virtual reality device, the remote computer may render a two-dimensional RGB virtual image and send this virtual image to the virtual reality device along with an associated depth map. The late stage reprojection machine may then adjust the received virtual image according to differences between the predicted future pose and the updated tracked pose, and further according to information included in the received depth map. Adjusting the two-dimensional virtual image to include information from the depth map may be done through any suitable technique including, for example, rendering the image on a tessellated plane as a heightmap, or building a voxel representation of the virtual environment. Further, virtual images may be rendered and/or modified by the virtual reality device via ray tracing, constructed as a virtual mesh, or via virtually any other suitable techniques. Further, the virtual reality device may locally render a depth map, and use this locally rendered depth map to occlude portions of a received virtual image, thereby reducing the latency of any occlusion operations. The techniques described above may allow virtual image rendering and display to be performed efficiently, independent of network transmission speed and/or remote computer rendering speed.

In some embodiments, a rendered virtual image may include additional content provided by the remote computer. For example, a remote computer may be connected to one or more local/remote content sources which provide audio and/or visual content. Further, content provided by the remote computer may include information pertaining to one or more hardware components/software operations of the remote computer. The additional content may be included in the virtual image in any suitable manner. For example, the virtual image may include visual content from a remote/local video service. This visual content may be included in the virtual image as a floating virtual monitor, or presented to the user in any other suitable manner. Additionally, when an application developer is using remote rendering to test changes in a software application, as described above, additional content provided to the virtual reality device may include, for example, debug information, and/or any other suitable information related to the virtual reality device and/or the remote computer.

Figure 5:
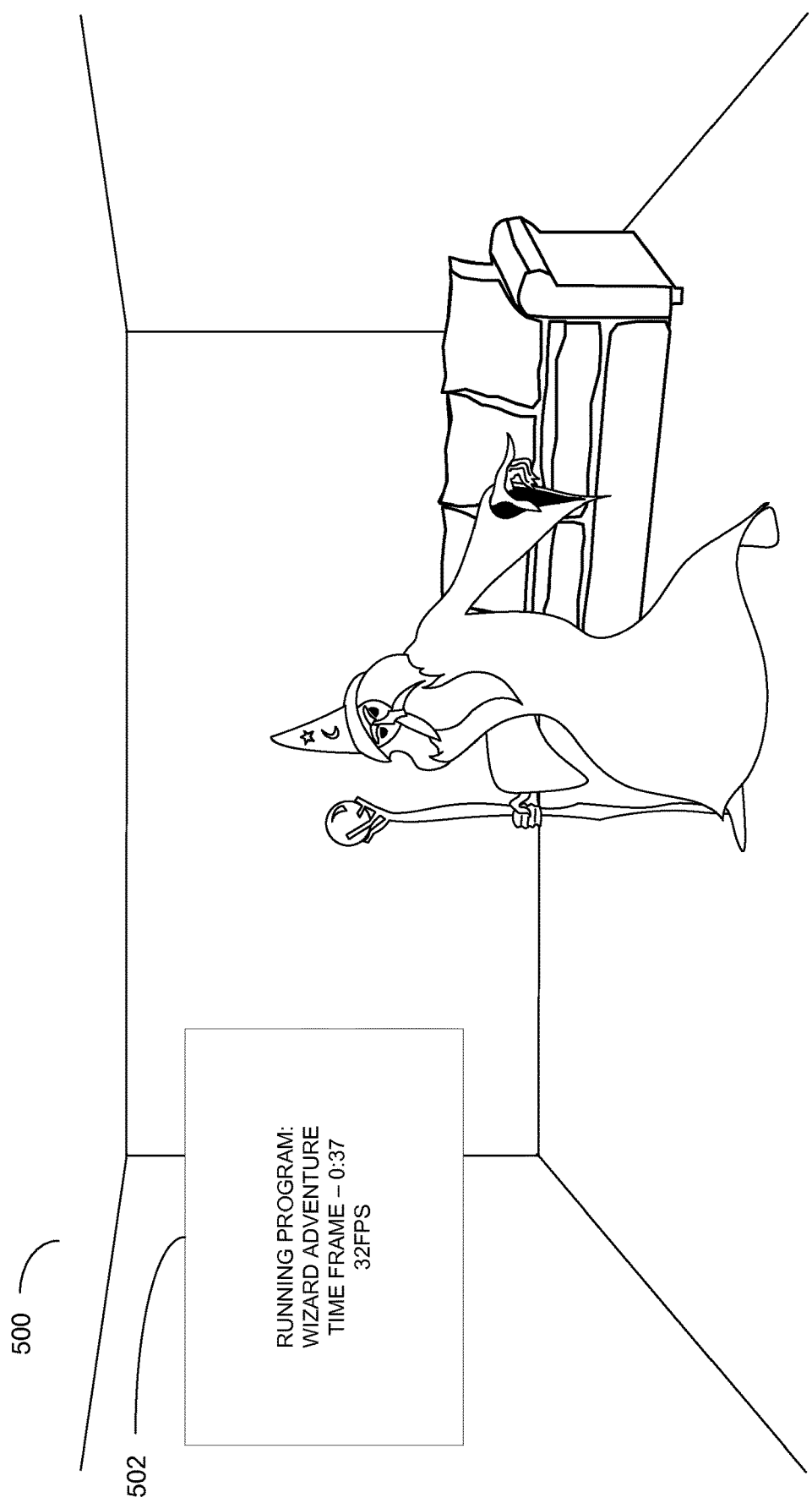
FIG. 5 schematically shows an example of a field of view of a virtual reality device.

FIG. 5 shows an example virtual object in the form of a content window 502. Content window 502 displays additional content provided by a remote computer and pertaining to a software application the remote computer is currently executing. Specifically, content window 502 indicates that a remote computer is currently executing a program called "Wizard Adventure," and sending the rendered virtual imagery to the virtual reality device. Content window 502 further includes information pertaining to the current time frame of the program, as well as the current frame rate. FOV 500 may include any number of content windows similar to content window 502, configured to display virtually any content provided by a remote computer. Further, a user may be able to interact with the content provided by the remote computer in any suitable way, including via one or more input devices included in the virtual reality device and/or included in the local environment. For example, a user may interact with content window 502 in order to change the information displayed, modify the code of the running application, and/or perform any other suitable operations.

Figure 6:
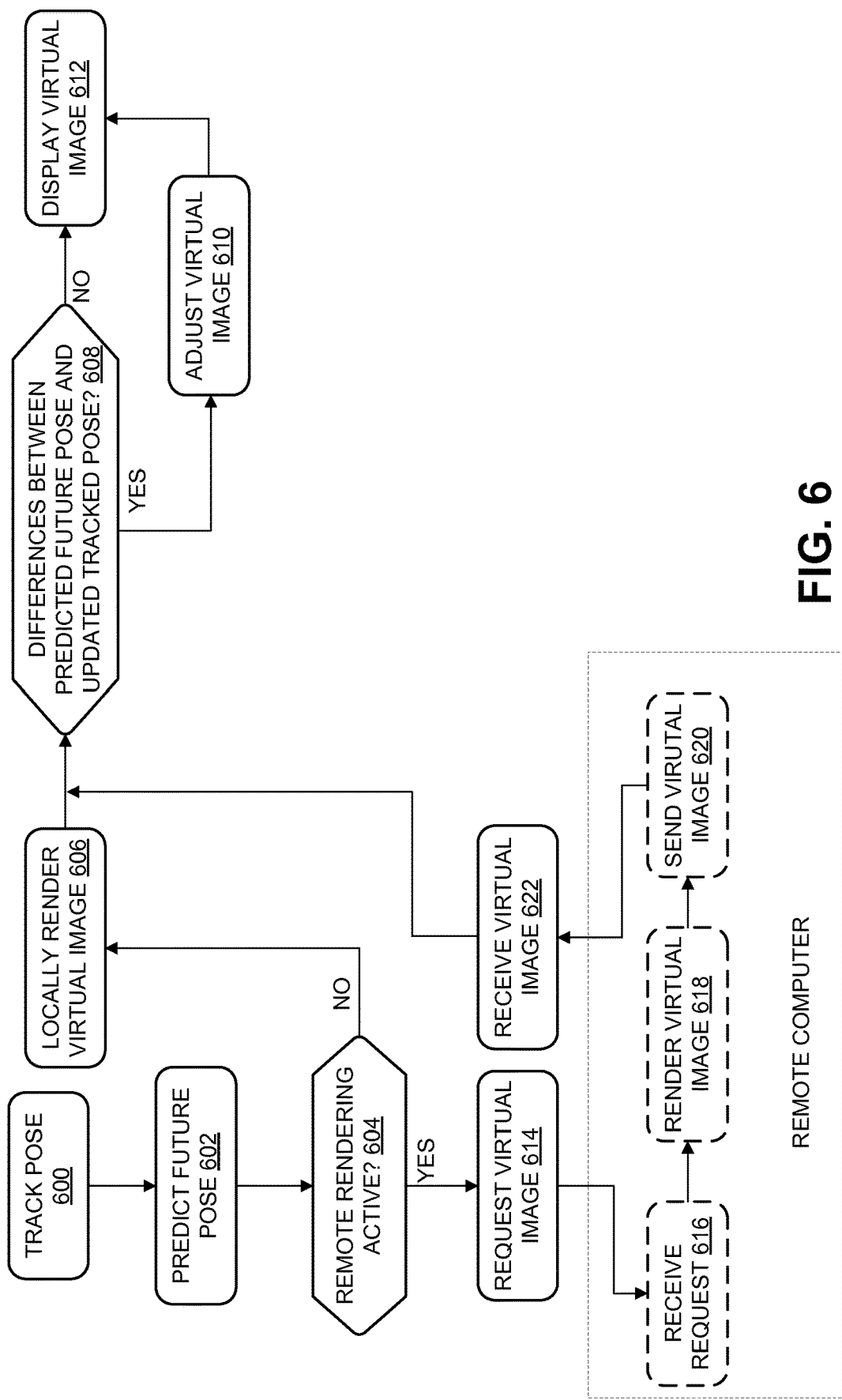
FIG. 6 illustrates an example flow diagram for a method of rendering and displaying virtual images.

FIG. 6 illustrates a method for rendering, adjusting, and displaying rendered virtual images. In some embodiments, a virtual reality device may be configured to switch between local and remote rendering of virtual images according to a variety of conditions. Further, during local rendering, a virtual reality device may still utilize pose prediction and late stage reprojection, as illustrated in FIG. 6.

The method starts at 600, where one or more sensors track a pose of the virtual reality device. Next, at 602, a pose prediction machine predicts a future pose of the virtual reality device at a future time.

At 604, the method determines if remote rendering is currently active. If remote rendering is not active (NO at 604), then the method proceeds to 606, where a local image renderer of the virtual reality device renders a virtual image for the predicted future pose. However, if remote rendering is active (YES at 604), then the method proceeds to 614.

From 606, the method proceeds to 608, where a late stage reprojection machine of the virtual reality device determines whether there are any differences between the future pose predicted at 602, and an updated tracked pose determined by the one or more sensors. If differences exist (YES at 608), then the method proceeds to 610. If no differences exist (NO at 608), then the method proceeds to 612.

At 610, the late stage reprojection machine adjusts the virtual image to an adjusted virtual image having an updated perspective corresponding to an updated tracked pose of the virtual reality device. Once the virtual image has been adjusted, the method proceeds to 612, where a virtual reality display of the virtual reality device displays the adjusted virtual image at or near the future time.

At 614, a communications machine of the virtual reality device sends to a remote computer a request for a virtual image having a perspective corresponding to the future pose of the virtual reality device. At 616, a remote communications machine of the remote computer receives the request from the virtual reality device.

Next, at 618, a virtual image renderer of the remote computer renders the virtual image for the virtual reality device as specified by the request received by the remote communications machine. Once the image has been rendered, the method proceeds to 620, at which point the remote communications machine sends to the virtual reality device the rendered virtual image.

At 622, the communications machine of the virtual reality device receives from the remote computer the virtual image, and the method proceeds to 608. The method of FIG. 6 may be continually performed, and one instance of the method may begin before a previous instance of the method ends.

Figure 7:
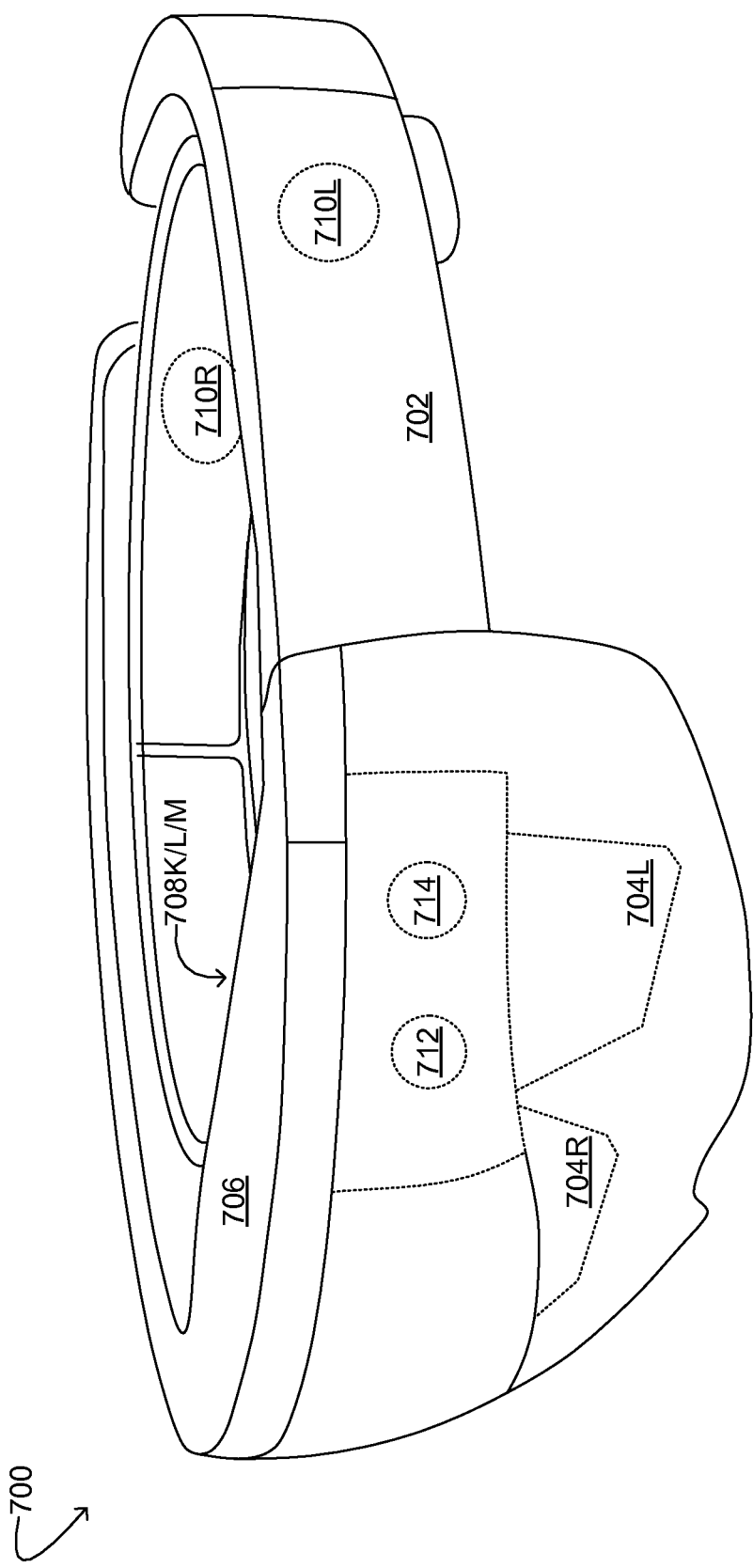
FIG. 7 schematically shows an example of a wearable computing device.

FIG. 7 shows aspects of an example head-mounted display (HMD) 700 to be worn and used by a wearer. The illustrated display system includes a frame 702. The frame supports stereoscopic, see-through display componentry, which is positioned close to the wearer's eyes. HMD 700 may be used in augmented-reality applications, where real-world imagery is admixed with virtual display imagery. It will be appreciated that in other examples, the HMD device 700 may take other suitable forms in which transparent, semi-transparent, and/or non-transparent displays are supported in front of a viewer's eye or eyes. It will also be appreciated that the virtual reality device 100 shown in FIG. 1 may take the form of the HMD device 700, as described in more detail below, or any other suitable HMD device.

HMD 700 includes separate right and left display panels, 704R and 704L, which may be wholly or partly transparent from the perspective of the wearer, to give the wearer a clear view of his or her surroundings. For example, the appearance of the physical environment may be augmented by graphical content (e.g., one or more pixels each having a respective color and brightness) that is presented via the display panels to create an augmented reality environment.

Each display panel includes a backlight and a liquid-crystal display (LCD) type microdisplay. The backlight may include an ensemble of light-emitting diodes (LEDs)—e.g., white LEDs or a distribution of red, green, and blue LEDs. The backlight may be configured to direct its emission through the LCD microdisplay, which forms a display image based on control signals from compute system 706. The LCD microdisplay may include numerous, individually addressable pixels arranged on a rectangular grid or other geometry. In some embodiments, pixels transmitting red light may be juxtaposed to pixels transmitting green and blue light, so that the LCD microdisplay forms a color image. In other embodiments, a reflective liquid-crystal-on-silicon (LCOS) microdisplay or a digital micromirror array may be used in lieu of the LCD microdisplay. Alternatively, an active LED, holographic, or scanned-beam microdisplay may be used to form right and left display images. Although the drawings show separate right and left display panels, a single display panel extending over both eyes may be used instead.

Compute system 706 is operatively coupled to the display panels and to other display-system componentry. The compute system may include a logic machine and a storage machine, as discussed in more detail below with respect to FIG. 8, that are in communication with the various sensors and systems of the HMD device and display. In one example, the storage machine may include instructions that are executable by the logic machine to receive sensor data from the sensors and predict a future pose of the HMD device, request a rendered virtual image via a communications machine, adjust a rendered virtual image, and display an adjusted virtual image via right and/or left display panels. HMD 700 may include an accelerometer 708K, gyroscope 708L, and magnetometer 708M, stereo loudspeakers 710R and 710L, a color camera 712, and a depth camera 714.

HMD device 700 may also include a head tracking system that utilizes one or more motion sensors, such as sensors 708 on HMD device 700, to capture pose data and thereby enable position tracking, direction and orientation sensing, and/or motion detection of the user's head and/or HMD device 700.

The head tracking system may also support other suitable positioning techniques, such as GPS or other global navigation systems. Further, while specific examples of position sensor systems have been described, it will be appreciated that any other suitable position sensor systems may be used. For example, pose and/or movement data may be determined based on sensor information from any combination of sensors mounted on the wearer and/or external to the wearer including, but not limited to, any number of gyroscopes, accelerometers, inertial measurement units (IMUs), GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples the HMD device 700 may also include an optical sensor system that utilizes one or more outward facing sensors, such as color camera 712 or depth camera 714 on HMD device 700, to capture image data. The outward facing sensor(s) may detect movements within its field of view, such as gesture-based inputs or other movements performed by a user or by a person or physical object within the field of view. The outward facing sensor(s) may also capture 2D image information and depth information from the physical environment and physical objects within the environment.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, modulated illumination may be provided by an infrared light source, and a phase difference between projected and reflected illumination may be used to calculate the time between projecting and detecting the light. It will be appreciated that any other suitable depth camera may be used within the scope of the present disclosure.

The outward facing sensor(s) may capture images of the physical environment in which a user is situated. With respect to the HMD device 700, in one example a mixed reality display program may include a 3D modeling system that uses such captured images to generate a virtual environment that models the physical environment surrounding the user.

In one example, the HMD 700 may include a gaze tracking system configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes.

Images of the glints and of the pupils as determined from image data gathered from the image sensors may be used to determine an optical axis of each eye. Using this information, the gaze tracking system may then determine a direction the user is gazing. The gaze tracking system may additionally or alternatively determine at what physical or virtual object the user is gazing. Such gaze tracking data may then be provided to the HMD device 700.

It will also be understood that the gaze tracking system may have any suitable number and arrangement of light sources and image sensors. For example, the gaze tracking system of the HMD device 700 may utilize at least one inward facing sensor.

The HMD device 700 may also include a microphone system that includes one or more microphones that capture audio data. In other examples, audio may be presented to the user via one or more speakers, such as speakers 710 on the HMD device 700.

In some embodiments, the methods and processes described herein may be tied to one or more computing systems of one or more computing devices. In particular, such methods and processes may be implemented as a computer-application program or service, an application-programming interface (API), a library, and/or other computer-program product.

Figure 8:
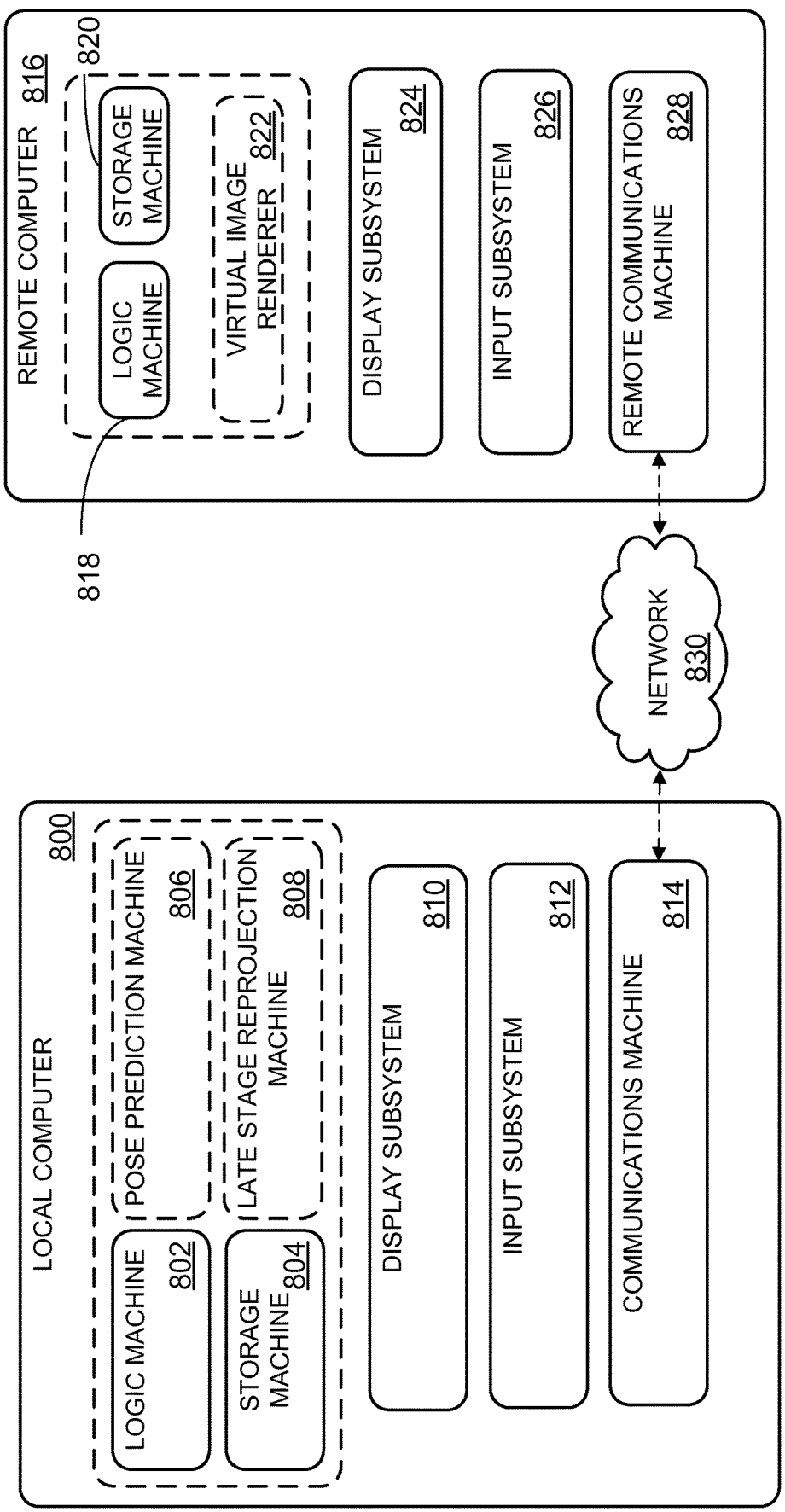
FIG. 8 schematically shows an example computing system.

FIG. 8 schematically shows a non-limiting embodiment of a local computer 800 and a remote computer 816 that can enact one or more of the methods and processes described above. Computers 800 and 816 are shown in simplified form. Computers 800 and 816 may take the form of one or more AR/VR HMD computers, personal computers, server computers, tablet computers, home-entertainment computers, network computing devices, gaming devices, mobile computing devices, mobile communication devices (e.g., smart phone), wearable computing devices, and/or other computing devices. In particular, local computer 800 and remote computer 816 may be implemented as a virtual reality device and/or a remote computer as described above.

Local computer 800 includes a logic machine 802 and a storage machine 804. Local computer 800 may optionally include a display subsystem 810, input subsystem 812, communications machine 814, and/or other components not shown in FIG. 8. Similarly, remote computer 816 includes a logic machine 818 and a storage machine 820. Remote computer 816 may optionally include a display subsystem 824, input subsystem 826, remote communications machine 828, and/or other components not shown in FIG. 8.

Logic machines 802 and 818 include one or more physical devices configured to execute instructions. For example, the logic machines may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machines may include one or more processors configured to execute software instructions. Additionally or alternatively, the logic machines may include one or more hardware or firmware logic machines configured to execute hardware or firmware instructions. Processors of the logic machines may be single-core or multi-core, and the instructions executed thereon may be configured for sequential, parallel, and/or distributed processing. Individual components of the logic machines optionally may be distributed among two or more separate devices, which may be remotely located and/or configured for coordinated processing. Aspects of the logic machines may be virtualized and executed by remotely accessible, networked computing devices configured in a cloud-computing configuration.

Storage machines 804 and 820 include one or more physical devices configured to hold instructions executable by the logic machines to implement the methods and processes described herein. When such methods and processes are implemented, the state of storage machines 804 and 820 may be transformed—e.g., to hold different data.

Storage machines 804 and 820 may include removable and/or built-in devices. Storage machines 804 and 820 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machines 804 and 820 may include volatile, nonvolatile, dynamic, static, read/write, read-only, random-access, sequential-access, location-addressable, file-addressable, and/or content-addressable devices.

It will be appreciated that storage machines 804 and 820 include one or more physical devices. However, aspects of the instructions described herein alternatively may be propagated by a communication medium (e.g., an electromagnetic signal, an optical signal, etc.) that is not held by a physical device for a finite duration.

Aspects of logic machines 802 and 818, and storage machines 804 and 820, may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The pose prediction machine 806 and the late stage reprojection machine 808 may be implemented via logic machine 802 and storage machine 804 and/or any other suitable devices. Further, the virtual image renderer 822 may be implemented via logic machine 818 and storage machine 820 and/or any other suitable devices. In some embodiments, the local computer 800 may include a local image renderer, as described above, which may additionally be implemented via logic machine 802 and storage machine 804. Further, the remote computer may include a pose prediction machine, as described above, which may be implemented via logic machine 818 and storage machine 820.

The terms "module," "program," and "engine" may be used to describe an aspect of computing system 800 implemented to perform a particular function. In some cases, a module, program, or engine may be instantiated via logic machines 802 and/or 818 executing instructions held by storage machines 804 and/or 820. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystems 810 and/or 824 may be used to present a visual representation of data held by storage machines 804 and/or 820. This visual representation may take the form of a graphical user interface (GUI). As the herein described methods and processes change the data held by the storage machines, and thus transform the state of the storage machines, the state of display subsystems 810 and 824 may likewise be transformed to visually represent changes in the underlying data. Display subsystems 810 and 824 may include one or more display devices utilizing virtually any type of technology. Such display devices may be combined with logic machines 802 and 818 and/or storage machines 804 and 820 in a shared enclosure, or such display devices may be peripheral display devices. In particular, display subsystem 810 may in some embodiments be implemented as a virtual reality display.

When included, input subsystems 812 and 826 may comprise or interface with one or more user-input devices such as a keyboard, mouse, touch screen, or game controller. In some embodiments, the input subsystems may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. In particular, the one or more sensors described above may in some embodiments be implemented as input subsystems 812 and/or 826.

When included, communications machine 814 and remote communications machine 828 may be configured to communicatively couple local computer 800 to remote computer 816 via network 830, and may be further configured to allow the local computer and/or the remote computer to communicate with one or more other computer systems. Communications machine 814 and remote communications machine 828 may include wired and/or wireless communication devices compatible with one or more different communication protocols. As non-limiting examples, the communications machines may be configured for communication via a wireless telephone network, or a wired or wireless local- or wide-area network. In some embodiments, the communications machines may allow local computer 800 and remote computer 816 to send and/or receive messages to and/or from other devices via a network such as the Internet.

In an example, a virtual reality device comprises: one or more sensors configured to track a pose of the virtual reality device; a pose prediction machine configured to predict a future pose of the virtual reality device at a future time; a communications machine configured to send to a remote computer a request for a virtual image having a perspective corresponding to the future pose of the virtual reality device and to receive from the remote computer the virtual image; a late stage reprojection machine configured to adjust the virtual image to an adjusted virtual image having an updated perspective corresponding to an updated tracked pose of the virtual reality device; and a virtual reality display configured to display the adjusted virtual image. In this example or any other example, the communications machine is further configured to determine a communications latency by measuring an elapsed time between the request being sent and the virtual image being received. In this example or any other example, the pose prediction machine is configured to dynamically adjust a buffer period between a current time and the future time for which the future pose is predicted, the buffer period dynamically increased with increasing communications latency and dynamically decreased with decreasing communications latency. In this example or any other example, the one or more sensors are configured to detect a motion of the virtual reality device in one or more dimensions. In this example or any other example, the pose prediction machine is configured to predict the future pose by extrapolating the detected motion forward from a current time to the future time. In this example or any other example, extrapolating the detected motion comprises extrapolating the detected motion forward with biomechanical constraints. In this example or any other example, extrapolating the detected motion comprises extrapolating the detected motion forward with environmental constraints. In this example or any other example, the virtual reality device is configured to display an image having a set resolution, and the virtual image is oversized relative to the set resolution. In this example or any other example, an amount of oversizing is proportional to a speed of the detected motion. In this example or any other example, an amount of oversizing in a first dimension of the virtual image is proportional to a speed of the detected motion in the first dimension, and an amount of oversizing in a second dimension of the virtual image is independently proportional to a speed of the detected motion in the second dimension. In this example or any other example, adjusting the virtual image comprises cropping the virtual image to the set resolution. In this example or any other example, adjusting the virtual image comprises shifting the virtual image by an amount that is proportional to a difference between the predicted future pose and the updated tracked pose. In this example or any other example, the virtual image is a three-dimensional image, adjusting the virtual image comprises independently shifting different aspects of the three-dimensional virtual image by an amount that is proportional to a difference between the predicted future pose and the updated tracked pose, and further comprises independently shifting each particular aspect of the three-dimensional virtual image by an amount that is inversely proportional to a virtual depth of the particular aspect. In this example or any other example, the virtual reality device further comprises a local virtual image renderer configured to locally render one or more virtual objects, and the virtual reality display is configured to display the one or more virtual objects rendered by the local virtual image renderer with the adjusted virtual image. In this example or any other example, the virtual reality device and the remote computer communicate over a computer network, and each of the virtual reality device and the remote computer occupy a different network node. In this example or any other example, the virtual image received from the remote computer includes additional content provided by the remote computer.

In an example, a computing device comprises: a remote communications machine configured to receive from a virtual reality device a request for a virtual image having a perspective corresponding to a predicted future pose of the virtual reality device, and send to the virtual reality device a rendered virtual image; and a virtual image renderer configured to render the virtual image for the virtual reality device as specified by the request received by the remote communications machine.

In an example, a virtual reality device comprises: one or more sensors configured to track a pose of the virtual reality device; a communications machine configured to send to a remote computer a request for a virtual image having a perspective corresponding to a future pose of the virtual reality device and to receive from the remote computer the virtual image; a late stage reprojection machine configured to adjust the virtual image to an adjusted virtual image having an updated perspective corresponding to an updated tracked pose of the virtual reality device; and a virtual reality display configured to display the adjusted virtual image. In this example or any other example, a future time of the future pose is dynamically predicted based on communication latency. In this example or any other example, the future pose is predicted by extrapolating detected motion forward from a current time to the future time.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A virtual reality device corresponding to a head-mounted display, comprising:
one or more sensors configured to track a pose of the virtual reality device;
a pose prediction machine configured to predict a future pose of the virtual reality device by extrapolating a detected motion of the virtual reality device forward from a current time to a future time, by applying one or more environmental constraints predicted to cause a deviation from the extrapolated detected motion based on a prediction that the virtual reality device will stop to focus on a recognized real-world object of interest in a surrounding real-world environment before the future time, and is configured to dynamically adjust a buffer period between the current time and the future time, the buffer period dynamically increased with increasing network communications latency and dynamically decreased with decreasing network communications latency;
a communications machine configured to send to a remote computer a request for a preliminarily-rendered virtual image having a perspective corresponding to the future pose of the virtual reality device as focused on the recognized object, and to receive from the remote computer the preliminarily-rendered virtual image, the preliminarily-rendered virtual image corresponding to the future pose;
a late stage reprojection machine configured to perform supplementary adjustment of the preliminarily-rendered virtual image to produce an adjusted virtual image having an updated perspective corresponding to an updated tracked pose of the virtual reality device; and
a virtual reality display configured to display the adjusted virtual image.

2. The virtual reality device of claim 1, wherein the communications machine is further configured to determine a network communications latency between the virtual reality device and the remote computer by measuring an elapsed time between the request being sent and the virtual image being received.

3. The virtual reality device of claim 1, wherein the one or more sensors are configured to detect a motion of the virtual reality device in one or more dimensions.

4. The virtual reality device of claim 3, wherein the virtual reality device is configured to display images having a set resolution, and wherein the preliminarily-rendered virtual image is oversized relative to the set resolution.

5. The virtual reality device of claim 4, wherein an amount of oversizing is proportional to a speed of the detected motion.

6. The virtual reality device of claim 5, wherein an amount of oversizing in a first dimension of the preliminarily-rendered virtual image is proportional to a speed of the detected motion in the first dimension, and wherein an amount of oversizing in a second dimension of the preliminarily-rendered virtual image is independently proportional to a speed of the detected motion in the second dimension.

7. The virtual reality device of claim 6, wherein performing supplementary adjustment of the preliminarily-rendered virtual image comprises cropping the preliminarily-rendered virtual image to the set resolution.

8. The virtual reality device of claim 1, wherein performing supplementary adjustment of the preliminarily-rendered virtual image comprises shifting the preliminarily-rendered virtual image by an amount that is proportional to a difference between the predicted future pose and the updated tracked pose.

9. The virtual reality device of claim 8, wherein the preliminarily-rendered virtual image is a three-dimensional image, performing supplementary adjustment of the preliminarily-rendered virtual image comprises independently shifting different aspects of the three-dimensional virtual image by an amount that is proportional to a difference between the predicted future pose and the updated tracked pose, and further comprises independently shifting each particular aspect of the three-dimensional virtual image by an amount that is inversely proportional to a virtual depth of the particular aspect.

10. The virtual reality device of claim 1, further comprising a local virtual image renderer configured to locally render one or more virtual objects, wherein the virtual reality display is configured to display the one or more virtual objects rendered by the local virtual image renderer with the adjusted virtual image.

11. The virtual reality device of claim 1, wherein the virtual reality device and the remote computer communicate over a computer network, and each of the virtual reality device and the remote computer occupy a different network node.

12. The virtual reality device of claim 1, wherein the preliminarily-rendered virtual image received from the remote computer includes additional content provided by the remote computer, the additional content including visual content retrieved by the remote computer from a remote video service.

13. A computing device, comprising:
a remote communications machine configured to receive from a virtual reality device corresponding to a head-mounted display a request for a preliminarily-rendered virtual image having a perspective corresponding to a predicted future pose of the virtual reality device, the predicted future pose predicted based on an extrapolation of a detected motion of the virtual reality device forward from a current time to a future time, by applying one or more environmental constraints predicted to cause a deviation from the extrapolation of the detected motion based on a prediction that the virtual reality device will stop to focus on a recognized real-world object of interest in a surrounding real-world environment before the future time, to dynamically adjust a buffer period between the current time and the future time, the buffer period dynamically increased with increasing network communications latency and dynamically decreased with decreasing network communications latency, and send to the virtual reality device the preliminarily-rendered virtual image, the preliminarily-rendered virtual image corresponding to the future pose; and
a virtual image renderer configured to render the preliminarily-rendered virtual image for the virtual reality device as specified by the request received by the remote communications machine.

14. A virtual reality device corresponding to a head-mounted display, comprising:
one or more sensors configured to track a pose of the virtual reality device;
a communications machine configured to send to a remote computer a request for a preliminarily-rendered virtual image having a perspective corresponding to a future pose of the virtual reality device, the future pose predicted by extrapolating a detected motion of the virtual reality device forward from a current time to a future time, by applying one or more environmental constraints predicted to cause a deviation from the extrapolated detected motion based on a prediction that the virtual reality device will stop to focus on a recognized real-world object of interest in a surrounding real-world environment before the future time, by dynamically adjusting a buffer period between the current time and the future time, the buffer period dynamically increased with increasing network communications latency and dynamically decreased with decreasing network communications latency, and to receive from the remote computer the preliminarily-rendered virtual image;
a late stage reprojection machine configured to perform supplementary adjustment of the preliminarily-rendered virtual image to an adjusted virtual image having an updated perspective corresponding to an updated tracked pose of the virtual reality device; and
a virtual reality display configured to display the adjusted virtual image.

* * * * *